United States Patent
Frank et al.

(10) Patent No.: US 9,948,872 B2
(45) Date of Patent: Apr. 17, 2018

(54) MONITOR AND CONTROL SYSTEMS AND METHODS FOR OCCUPANT SAFETY AND ENERGY EFFICIENCY OF STRUCTURES

(71) Applicant: FLIR Systems, Inc., Wilsonville, OR (US)

(72) Inventors: Jeffrey D. Frank, Santa Barbara, CA (US); Pierre Boulanger, Goleta, CA (US); Shawn Jepson, Goleta, CA (US); Patrick B. Richardson, Santa Barbara, CA (US); Nile E. Fairfield, Goleta, CA (US); Nicholas Högasten, Santa Barbara, CA (US); Theodore R. Hoelter, Goleta, CA (US); Katrin Strandemar, Rimbo (SE)

(73) Assignee: FLIR Systems, Inc., Wilsonville, OR (US)

(*) Notice: Subject to any disclaimer, the term of this patent is extended or adjusted under 35 U.S.C. 154(b) by 84 days.

(21) Appl. No.: 13/902,115

(22) Filed: May 24, 2013

(65) Prior Publication Data
US 2013/0321637 A1    Dec. 5, 2013

Related U.S. Application Data

(63) Continuation-in-part of application No. PCT/US2012/041744, filed on Jun. 8, 2012, which is
(Continued)

(51) Int. Cl.
*H04N 5/365* (2011.01)
*H04N 5/33* (2006.01)
*H04N 5/225* (2006.01)

(52) U.S. Cl.
CPC ............ *H04N 5/33* (2013.01); *H04N 5/2257* (2013.01); *H04N 5/3658* (2013.01)

(58) Field of Classification Search
None
See application file for complete search history.

(56) References Cited

U.S. PATENT DOCUMENTS

| 2,764,055 A | 9/1956 | Clemens et al. |
| 5,258,621 A | 11/1993 | Noble |

(Continued)

FOREIGN PATENT DOCUMENTS

| CA | 2764055 | 7/2012 |
| CN | 1917590 | 2/2007 |

(Continued)

OTHER PUBLICATIONS

Neto et al., "Figures of merit and optimization of a $VO_2$ microbolometer with strong electrothermal feedback", SPIE, Jul. 1, 2008, pp. 1-15, vol. 47, No. 7, Bellingham, WA.
(Continued)

*Primary Examiner* — William C Vaughn, Jr.
*Assistant Examiner* — Lindsay Uhl
(74) *Attorney, Agent, or Firm* — Haynes and Boone, LLP

(57) ABSTRACT

Various systems and methods are disclosed for monitoring and controlling using small infrared imaging modules to enhance occupant safety and energy efficiency of buildings and structures. In one example, thermal images captured by infrared imaging modules may be analyzed to detect presence of persons, identify and classify power-consuming objects, and monitor environmental conditions. Based on the processed thermal images, various power-consuming objects (e.g., an HVAC system, lighting, a water heater, and other appliances) may be controlled to increase energy efficiency. In another example, thermal images captured by infrared imaging modules may be analyzed to detect various hazardous conditions, such as a combustible gas leak, a CO gas leak, a water leak, fire, smoke, and, an electrical hotspot.
(Continued)

If such hazardous conditions are detected, an appropriate warning may be generated and/or various objects may be controlled to remedy the conditions.

20 Claims, 20 Drawing Sheets

Related U.S. Application Data a continuation-in-part of application No. PCT/US2012/041749, filed on Jun. 8, 2012, which is a continuation-in-part of application No. PCT/US2012/041739, filed on Jun. 8, 2012, which is a continuation-in-part of application No. 13/622,178, filed on Sep. 18, 2012, now Pat. No. 9,237,284, which is a continuation-in-part of application No. 13/529,772, filed on Jun. 21, 2012, now Pat. No. 8,780,208, which is a continuation of application No. 12/396,340, filed on Mar. 2, 2009, now Pat. No. 8,208,026.

(60) Provisional application No. 61/651,976, filed on May 25, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011.

(56) References Cited

U.S. PATENT DOCUMENTS

| | | | |
|---|---|---|---|
| 5,555,512 A * | 9/1996 | Imai | G06K 9/00369 250/342 |
| 5,654,549 A | 8/1997 | Landecker et al. | |
| 5,881,182 A | 3/1999 | Fiete et al. | |
| 5,903,659 A * | 5/1999 | Kilgore | 382/103 |
| 6,297,794 B1 | 10/2001 | Tsubouchi et al. | |
| 6,330,371 B1 | 12/2001 | Chen et al. | |
| 6,348,951 B1 | 2/2002 | Kim | |
| 6,396,543 B1 | 5/2002 | Shin et al. | |
| 6,424,843 B1 | 7/2002 | Reitmaa et al. | |
| 6,633,231 B1 | 10/2003 | Okamoto et al. | |
| 6,681,120 B1 | 1/2004 | Kim | |
| 6,759,949 B2 | 7/2004 | Miyahara | |
| 6,883,054 B2 | 4/2005 | Yamaguchi et al. | |
| 6,911,652 B2 | 6/2005 | Walkenstein | |
| 7,050,107 B1 | 5/2006 | Frank et al. | |
| D524,785 S | 7/2006 | Huang | |
| 7,084,857 B2 | 8/2006 | Lieberman et al. | |
| 7,208,733 B2 | 4/2007 | Mian et al. | |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim | |
| 7,333,832 B2 | 2/2008 | Tsai et al. | |
| 7,377,835 B2 | 5/2008 | Parkulo et al. | |
| 7,420,663 B2 | 9/2008 | Wang et al. | |
| 7,453,064 B2 | 11/2008 | Lee | |
| 7,477,309 B2 | 1/2009 | Cuccias | |
| 7,566,942 B2 | 7/2009 | Viens et al. | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,595,904 B2 | 9/2009 | Lapstun et al. | |
| 7,616,877 B2 | 11/2009 | Zarnowski et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,872,574 B2 | 1/2011 | Betts et al. | |
| 7,900,842 B2 | 3/2011 | Silverbrook et al. | |
| 7,903,152 B2 | 3/2011 | Kim | |
| 7,947,222 B2 | 5/2011 | Bae et al. | |
| 7,960,700 B2 | 6/2011 | Craig et al. | |
| 8,203,116 B2 | 6/2012 | Young | |
| 8,208,026 B2 | 6/2012 | Högasten et al. | |
| 8,275,413 B1 | 9/2012 | Fraden et al. | |
| 8,305,577 B2 | 11/2012 | Kivioja et al. | |
| 8,345,226 B2 | 1/2013 | Zhang | |
| 8,537,343 B2 | 9/2013 | Zhang | |
| 8,781,420 B2 | 7/2014 | Schlub et al. | |
| 8,825,112 B1 | 9/2014 | Fraden et al. | |
| 2002/0006337 A1 | 1/2002 | Kimura et al. | |
| 2002/0030478 A1* | 3/2002 | Nagamitsu | G07F 15/003 324/110 |
| 2002/0058352 A1 | 5/2002 | Jacksen et al. | |
| 2002/0122036 A1 | 9/2002 | Sasaki | |
| 2002/0135571 A1 | 9/2002 | Klocek et al. | |
| 2002/0140542 A1 | 10/2002 | Prokoski et al. | |
| 2002/0149600 A1 | 10/2002 | Van Splunter et al. | |
| 2003/0007193 A1 | 1/2003 | Sato et al. | |
| 2003/0112871 A1 | 6/2003 | Demos | |
| 2003/0122957 A1 | 7/2003 | Emme | |
| 2003/0198400 A1 | 10/2003 | Alderson et al. | |
| 2003/0223623 A1 | 12/2003 | Gutta et al. | |
| 2004/0047518 A1 | 3/2004 | Tiana | |
| 2004/0101298 A1 | 5/2004 | Mandelbaum et al. | |
| 2004/0127156 A1 | 7/2004 | Park | |
| 2004/0128070 A1 | 7/2004 | Schmidt et al. | |
| 2004/0157612 A1 | 8/2004 | Kim | |
| 2004/0165788 A1 | 8/2004 | Perez et al. | |
| 2004/0169860 A1 | 9/2004 | Jung et al. | |
| 2004/0207036 A1 | 10/2004 | Ikeda | |
| 2004/0256561 A1 | 12/2004 | Beuhler et al. | |
| 2005/0030314 A1 | 2/2005 | Dawson | |
| 2005/0067852 A1 | 3/2005 | Jeong | |
| 2005/0089241 A1 | 4/2005 | Kawanishi et al. | |
| 2005/0068333 A1 | 5/2005 | Nakahashi et al. | |
| 2005/0093890 A1 | 5/2005 | Baudisch | |
| 2005/0110803 A1 | 5/2005 | Sugimura | |
| 2005/0138569 A1 | 6/2005 | Baxter et al. | |
| 2005/0169655 A1 | 8/2005 | Koyama et al. | |
| 2005/0184993 A1 | 8/2005 | Ludwin et al. | |
| 2005/0213813 A1 | 9/2005 | Lin et al. | |
| 2005/0213853 A1 | 9/2005 | Maier et al. | |
| 2005/0219249 A1 | 10/2005 | Xie et al. | |
| 2005/0248912 A1 | 11/2005 | Kang et al. | |
| 2005/0265423 A1* | 12/2005 | Mahowald et al. | 374/121 |
| 2005/0265688 A1 | 12/2005 | Kobayashi | |
| 2005/0270784 A1 | 12/2005 | Hahn et al. | |
| 2005/0277447 A1 | 12/2005 | Buil et al. | |
| 2006/0039686 A1 | 2/2006 | Soh et al. | |
| 2006/0043303 A1* | 3/2006 | Safai | G01N 21/954 250/347 |
| 2006/0060984 A1 | 3/2006 | Wakabayashi et al. | |
| 2006/0077246 A1 | 4/2006 | Kawakami et al. | |
| 2006/0097172 A1 | 5/2006 | Park | |
| 2006/0120712 A1 | 6/2006 | Kim | |
| 2006/0132642 A1 | 6/2006 | Hosaka et al. | |
| 2006/0140501 A1 | 6/2006 | Tadas | |
| 2006/0147191 A1 | 7/2006 | Kim | |
| 2006/0154559 A1 | 7/2006 | Yoshida | |
| 2006/0167595 A1* | 7/2006 | Breed | B60R 21/01536 701/1 |
| 2006/0210249 A1 | 9/2006 | Seto | |
| 2006/0234744 A1 | 10/2006 | Sung et al. | |
| 2006/0240867 A1 | 10/2006 | Wang et al. | |
| 2006/0262210 A1 | 11/2006 | Smith et al. | |
| 2006/0279632 A1 | 12/2006 | Anderson | |
| 2006/0279758 A1 | 12/2006 | Myoki | |
| 2006/0285907 A1 | 12/2006 | Kang et al. | |

(56) References Cited

U.S. PATENT DOCUMENTS

| | | |
|---|---|---|
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1* | 2/2007 | Huang .................... H04N 5/33 |
| | | 250/338.3 |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0216786 A1 | 9/2007 | Hung et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Palk et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0259181 A1 | 10/2008 | Yamashita et al. |
| 2008/0266079 A1 | 10/2008 | Lontka |
| 2008/0277486 A1* | 11/2008 | Seem ................... F24F 11/0009 |
| | | 236/49.3 |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0141124 A1 | 6/2009 | Liu et al. |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0257679 A1 | 10/2009 | Hogasten |
| 2009/0278048 A1 | 11/2009 | Choe et al. |
| 2009/0297062 A1 | 12/2009 | Molne et al. |
| 2009/0303363 A1 | 12/2009 | Blessinger |
| 2010/0020229 A1 | 1/2010 | Hershey et al. |
| 2010/0054545 A1* | 3/2010 | Elliott ......................... 382/115 |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0161149 A1* | 6/2010 | Nguyen .................. G06F 1/266 |
| | | 700/296 |
| 2010/0163730 A1 | 7/2010 | Schmidt et al. |
| 2010/0164713 A1* | 7/2010 | Wedig et al. ............ 340/539.13 |
| 2010/0165122 A1 | 7/2010 | Castorina et al. |
| 2010/0220193 A1 | 9/2010 | Hogasten |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2011/0205367 A1 | 8/2011 | Brown et al. |
| 2012/0007987 A1 | 1/2012 | Gaber |
| 2012/0083314 A1 | 4/2012 | Ng et al. |
| 2012/0184252 A1 | 7/2012 | Hirsch |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0204570 A1 | 8/2013 | Mendelson et al. |
| 2013/0320220 A1 | 12/2013 | Donowsky |
| 2014/0092257 A1 | 4/2014 | Hogasten et al. |

FOREIGN PATENT DOCUMENTS

| | | |
|---|---|---|
| CN | 2874947 | 2/2007 |
| CN | 2899321 | 5/2007 |
| CN | 100466678 C | 3/2009 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 1983485 | 10/2008 |
| EP | 2136554 | 12/2009 |
| EP | 2477391 | 7/2012 |
| EP | 2719165 | 4/2014 |
| JP | 1997275518 | 4/1999 |
| JP | 2000172962 A * | 6/2000 |
| JP | 2002/344814 | 11/2002 |
| JP | 2004/004465 | 1/2004 |
| JP | 2004048571 | 2/2004 |
| JP | 2004/241491 | 8/2004 |
| JP | 2006098098 | 4/2006 |
| JP | 2006105655 | 4/2006 |
| JP | 2007006475 | 1/2007 |
| JP | 2007/267035 | 10/2007 |
| JP | 2007325842 | 12/2007 |
| JP | 2010181324 | 8/2010 |
| JP | 2012231309 | 11/2012 |
| KR | 20000026757 | 5/2000 |
| KR | 100272582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |

(56) References Cited

FOREIGN PATENT DOCUMENTS

| | | |
|---|---|---|
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |

(56) References Cited

FOREIGN PATENT DOCUMENTS

| KR | 20100123021 | 11/2010 |
|---|---|---|
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 00/23814 | 4/2000 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |
| WO | WO 2010/121354 A1 | 10/2010 |

OTHER PUBLICATIONS

Tzimopoulou et al., "Scene based techniques for nonuniformity correction of infrared focal plane arrays", Proceedings of SPIE, Jul. 19, 1998, pp. 172-183, vol. 3436, International Society for Optical Engineering, US.

Perry, Greg, "Counters and Accumulators." Absolute Beginner's Guide to Programming, Second Edition, Que, 2001, Safari Books Online Web. May 19, 2014.

Darpa, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

Reddy et al., "Reference Free Nonuniformity Correction for Mercury Cadmium Telluride Infrared Focal Plane Arrays," Communications and Signal Processing, 1998.COMSIG'98. Proceedings of the 1998 South African Symposium, Sep. 8, 1998, pp. 243-248.

\* cited by examiner

MONITOR AND CONTROL SYSTEMS AND METHODS FOR OCCUPANT SAFETY AND ENERGY EFFICIENCY OF STRUCTURES

CROSS-REFERENCE TO RELATED APPLICATIONS

This patent application claims the benefit of U.S. Provisional Patent Application No. 61/651,976 filed May 25, 2012 and entitled "MONITOR AND CONTROL SYSTEMS AND METHODS FOR OCCUPANT SAFETY AND ENERGY EFFICIENCY OF STRUCTURES" which is hereby incorporated by reference in its entirety.

This patent application is a continuation-in-part of International Patent Application No. PCT/US2012/041744 filed Jun. 8, 2012 and entitled "LOW POWER AND SMALL FORM FACTOR INFRARED IMAGING," which is incorporated herein by reference in its entirety.

International Patent Application No. PCT/US2012/041744 claims priority to and the benefit of U.S. Provisional Patent Application No. 61/656,889 filed Jun. 7, 2012 and entitled "LOW POWER AND SMALL FORM FACTOR INFRARED IMAGING," which are incorporated herein by reference in their entirety.

International Patent Application No. PCT/US2012/041744 claims priority to and the benefit of U.S. Provisional Patent Application No. 61/545,056 filed Oct. 7, 2011 and entitled "NON-UNIFORMITY CORRECTION TECHNIQUES FOR INFRARED IMAGING DEVICES," which are incorporated herein by reference in their entirety.

International Patent Application No. PCT/US2012/041744 claims priority to and the benefit of U.S. Provisional Patent Application No. 61/495,873 filed Jun. 10, 2011 and entitled "INFRARED CAMERA PACKAGING SYSTEMS AND METHODS," which are incorporated herein by reference in their entirety.

International Patent Application No. PCT/US2012/041744 claims priority to and the benefit of U.S. Provisional Patent Application No. 61/495,879 filed Jun. 10, 2011 and entitled "INFRARED CAMERA SYSTEM ARCHITECTURES," which are incorporated herein by reference in their entirety.

International Patent Application No. PCT/US2012/041744 claims priority to and the benefit of U.S. Provisional Patent Application No. 61/495,888 filed Jun. 10, 2011 and entitled "INFRARED CAMERA CALIBRATION TECHNIQUES," which are incorporated herein by reference in their entirety.

This patent application is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES," which is incorporated herein by reference in its entirety.

International Patent Application No. PCT/US2012/041749 claims priority to and the benefit of U.S. Provisional Patent Application No. 61/545,056 filed Oct. 7, 2011 and entitled "NON-UNIFORMITY CORRECTION TECHNIQUES FOR INFRARED IMAGING DEVICES," which are incorporated herein by reference in their entirety.

International Patent Application No. PCT/US2012/041749 claims priority to and the benefit of U.S. Provisional Patent Application No. 61/495,873 filed Jun. 10, 2011 and entitled "INFRARED CAMERA PACKAGING SYSTEMS AND METHODS," which are incorporated herein by reference in their entirety.

International Patent Application No. PCT/US2012/041749 claims priority to and the benefit of U.S. Provisional Patent Application No. 61/495,879 filed Jun. 10, 2011 and entitled "INFRARED CAMERA SYSTEM ARCHITECTURES," which are incorporated herein by reference in their entirety.

International Patent Application No. PCT/US2012/041749 claims priority to and the benefit of U.S. Provisional Patent Application No. 61/495,888 filed Jun. 10, 2011 and entitled "INFRARED CAMERA CALIBRATION TECHNIQUES," which are incorporated herein by reference in their entirety.

This patent application is a continuation-in-part of International Patent Application No. PCT/US2012/041739 filed Jun. 8, 2012 and entitled "INFRARED CAMERA SYSTEM ARCHITECTURES," which is hereby incorporated by reference in its entirety.

International Patent Application No. PCT/US2012/041739 claims priority to and the benefit of U.S. Provisional Patent Application No. 61/495,873 filed Jun. 10, 2011 and entitled "INFRARED CAMERA PACKAGING SYSTEMS AND METHODS," which are incorporated herein by reference in their entirety.

International Patent Application No. PCT/US2012/041739 claims priority to and the benefit of U.S. Provisional Patent Application No. 61/495,879 filed Jun. 10, 2011 and entitled "INFRARED CAMERA SYSTEM ARCHITECTURES," which are incorporated herein by reference in their entirety.

International Patent Application No. PCT/US2012/041739 claims priority to and the benefit of U.S. Provisional Patent Application No. 61/495,888 filed Jun. 10, 2011 and entitled "INFRARED CAMERA CALIBRATION TECHNIQUES," which are incorporated herein by reference in their entirety.

This patent application is a continuation-in-part of U.S. patent application Ser. No. 13/622,178 filed Sep. 18, 2012 and entitled "SYSTEMS AND METHODS FOR PROCESSING INFRARED IMAGES," which is a continuation-in-part of U.S. patent application Ser. No. 13/529,772 filed Jun. 21, 2012 and entitled "SYSTEMS AND METHODS FOR PROCESSING INFRARED IMAGES," which is a continuation of U.S. patent application Ser. No. 12/396,340 filed Mar. 2, 2009 and entitled "SYSTEMS AND METHODS FOR PROCESSING INFRARED IMAGES," which are incorporated herein by reference in their entirety.

TECHNICAL FIELD

One or more embodiments of the invention relate generally to thermal imaging devices and more particularly, for example, to the use of thermal images to monitor and control occupant safety and energy efficiency of structures.

BACKGROUND

There is a movement to increase energy efficiency of residential dwellings and commercial buildings. For example, governments are increasingly enacting laws and green building codes that require new buildings to conform to more stringent energy efficiency standards and to reduce their carbon footprint. Similarly, public utilities are introducing incentive programs to encourage residential consumers to reduce their utility usage through conservation efforts and increased energy efficiency. In addition, to enhance home safety, homes are required to have fire detectors, smoke detectors, and increasingly carbon monoxide (CO) detectors.

While mandating higher energy efficiency and safety standards are important, they also require installations of various types of devices, sensors, and detectors in homes and buildings. Conventionally, a room may have a motion detector to detect for the presence of people in the room to automatically control lighting, a thermostat to control the heating, venting, and air conditioning (HVAC) system, other power sensors to control power usage, a fire alarm, a smoke detector, and a CO detector. Such conventional detectors and sensors are not capable of acquiring data with the detail necessary to enable high-level analytics or detection of multiple types of events. For example, conventional passive infrared (PIR) motion detectors are built with only one to four pyroelectric cells, which are only good for detecting changes in thermal energy in a given area.

As such, such conventional devices, sensors, and detectors are not cost-effective, because many different devices, sensors, and detectors are required to provide a comprehensive monitoring and control. Further, even when many different devices, sensors, and detectors are installed, they still may not provide the detailed data necessary for intelligent monitoring and control suitable for modern green buildings. As the movement toward greener and safer buildings gathers momentum, these conventional sensors and detectors may become even more cost prohibitive and yet insufficient.

SUMMARY

Various systems and methods are disclosed for monitoring and controlling using small infrared imaging modules to enhance occupant safety and energy efficiency of buildings and structures. In one example, thermal images captured by infrared imaging modules may be analyzed to detect presence of persons, identify and classify power-consuming objects, and monitor environmental conditions. Based on the processed thermal images, various power-consuming objects (e.g., an HVAC system, lighting, a water heater, and other appliances) may be controlled to increase energy efficiency. In another example, thermal images captured by infrared imaging modules may be analyzed to detect various hazardous conditions, such as a combustible gas leak, a CO gas leak, a water leak, fire, smoke, and, an electrical hotspot. If such hazardous conditions are detected, an appropriate warning may be generated and/or various objects may be controlled to remedy the conditions.

In one embodiment, a monitor and control system includes one or more infrared image sensors comprising a focal plane array (FPA) configured to capture a thermal image of an area; a processor configured to process the thermal image to detect presence of one or more persons in the area, and to generate control signals to control future power usage of one or more objects based at least in part on the detected presence or non-presence of one or more persons; and a communication module configured to transmit the control signals to control the future power usage of the one or more objects.

In another embodiment, a monitor and control method includes capturing, at a focal plane array of an infrared imaging module, a thermal image of an area; processing the thermal image to detect presence of one or more persons in the area; generating control signals to control future power usage of one or more objects based at least in part on the detected presence or non-presence of one or more persons; and communicating the control signals to the objects over a network.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
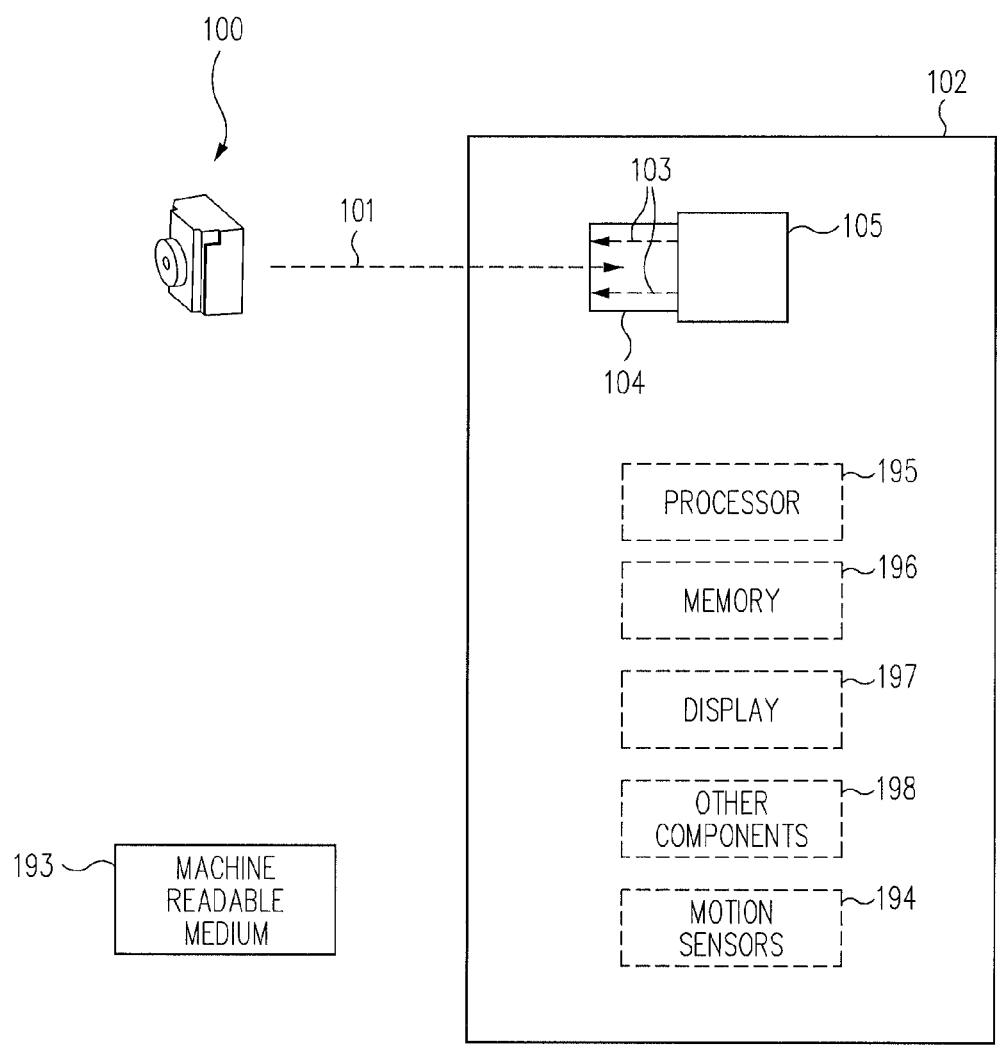
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
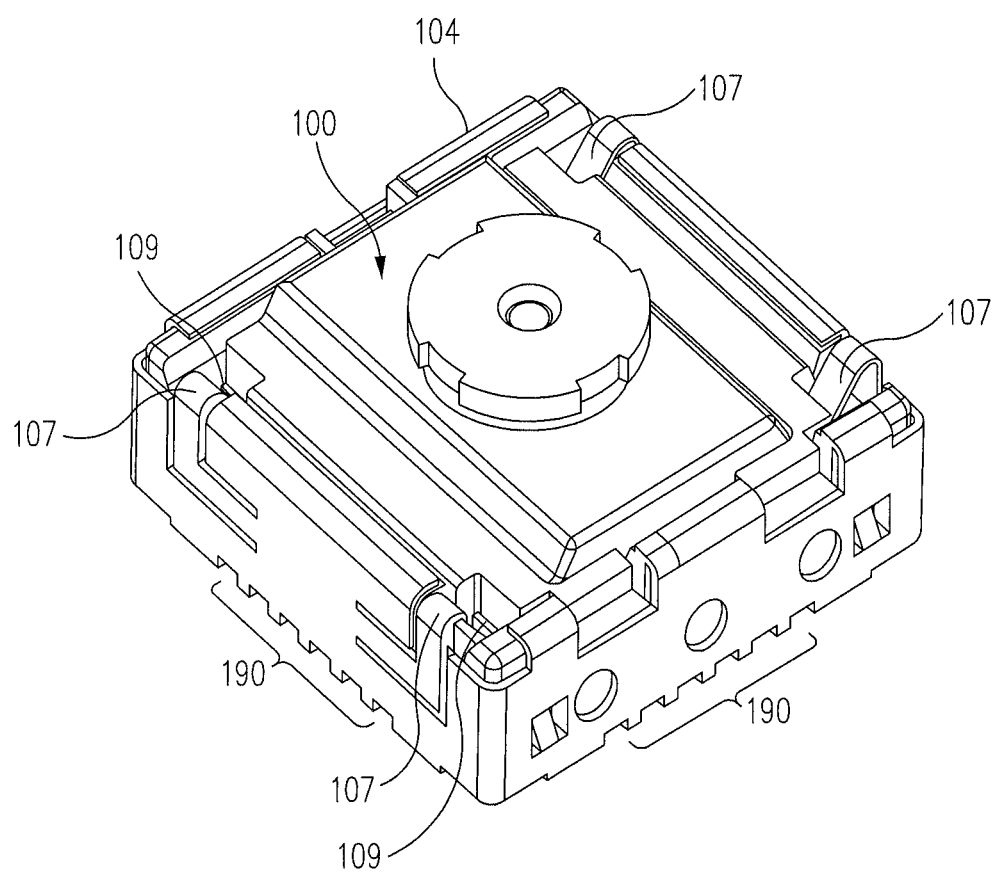
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
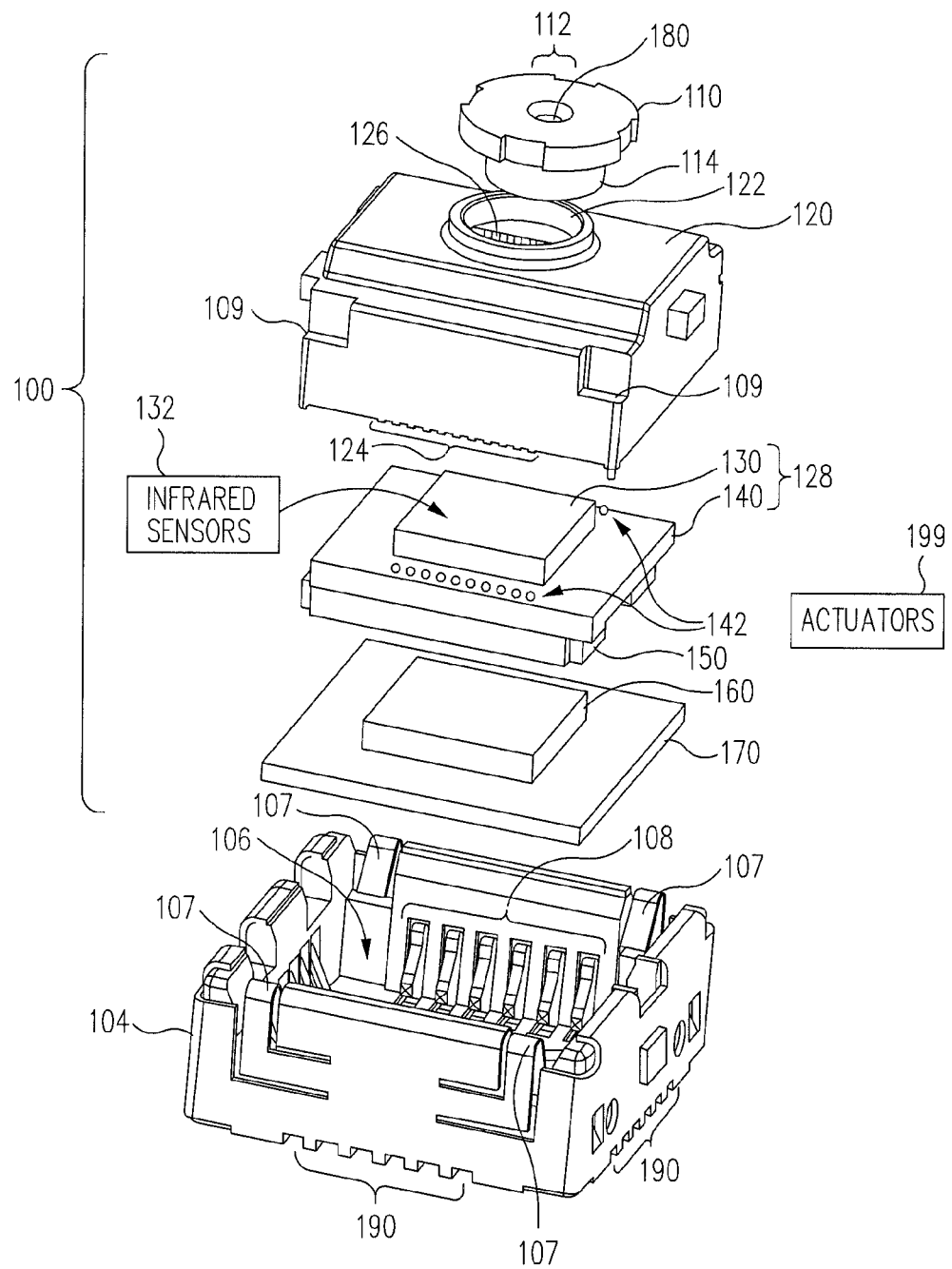
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
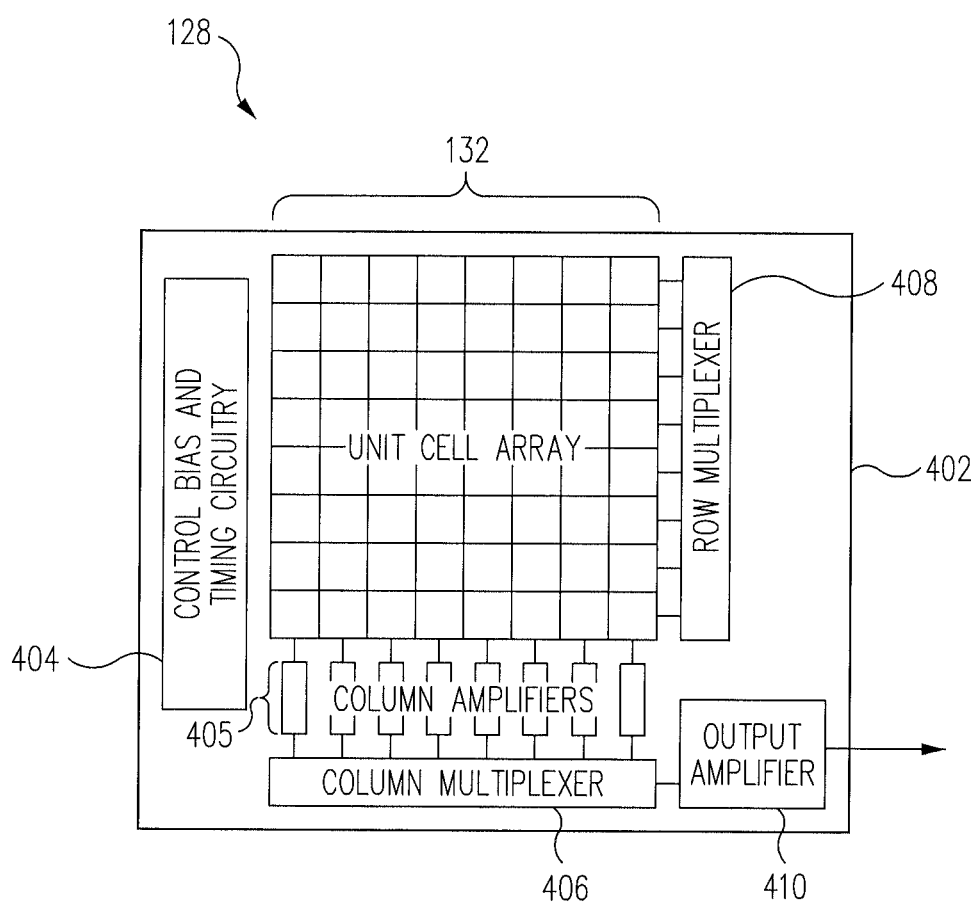
FIG. 4 illustrates a block diagram of infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
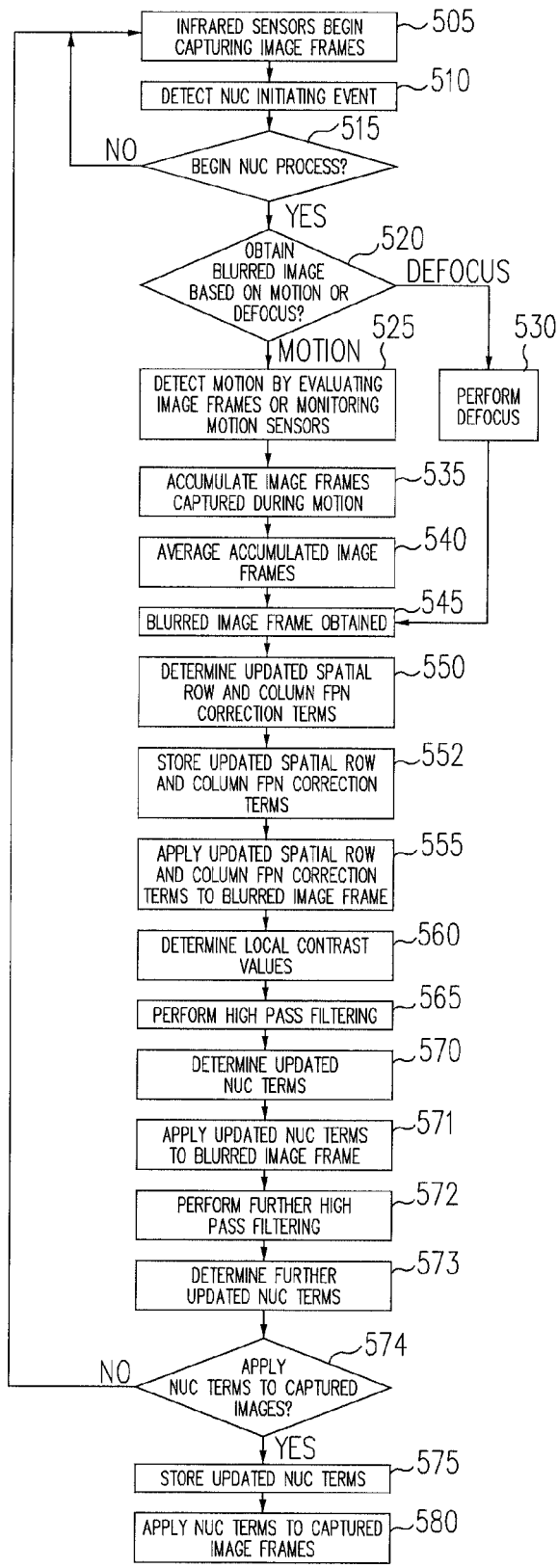
FIG. 5 illustrates a flow diagram of various operations to determine NUC terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is exceeded (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
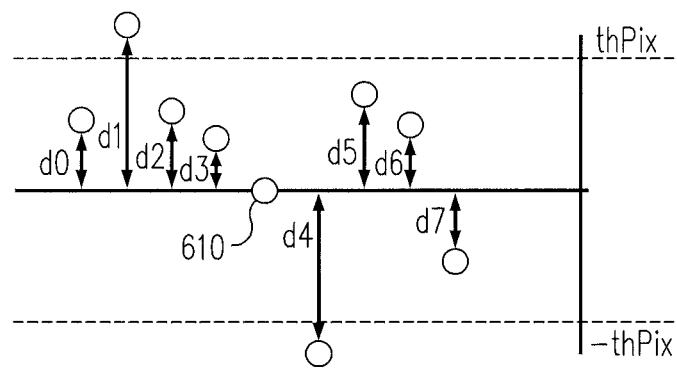
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and -thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination of (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
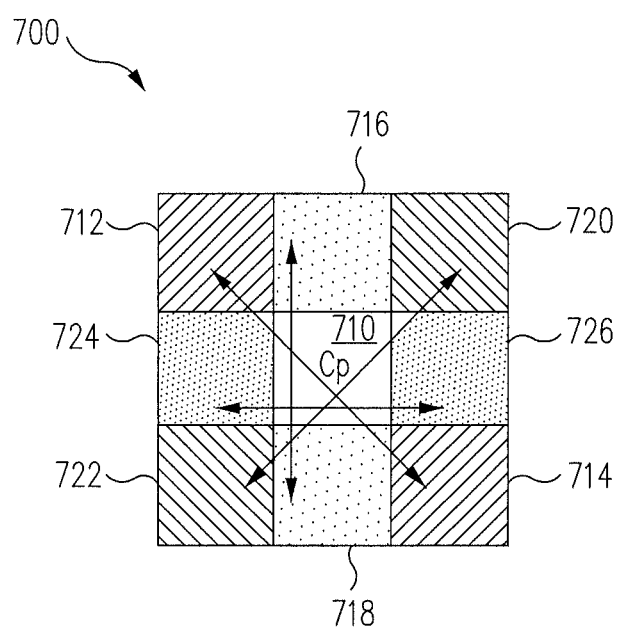
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor $\lambda$ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
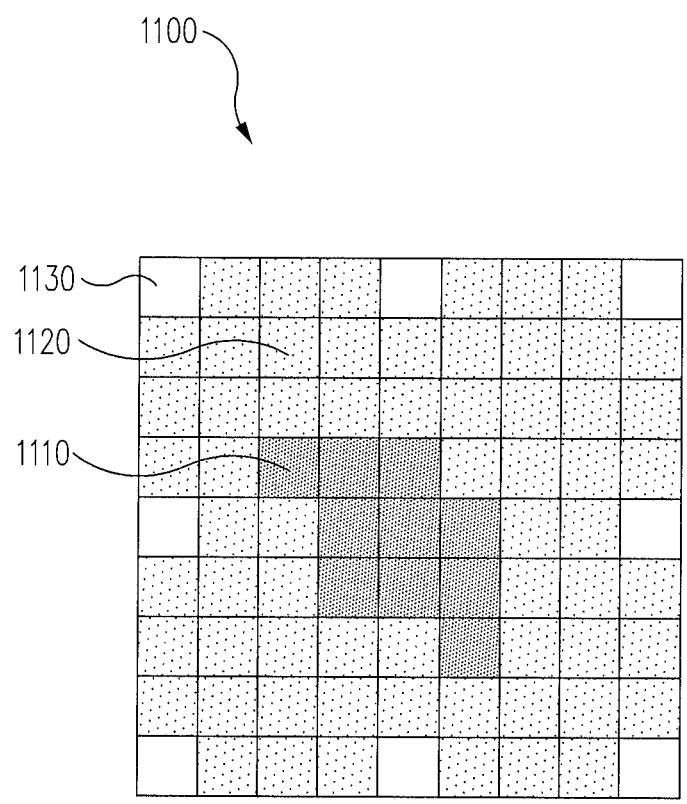
FIG. 11 illustrates spatially correlated FPN in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor $\lambda$ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
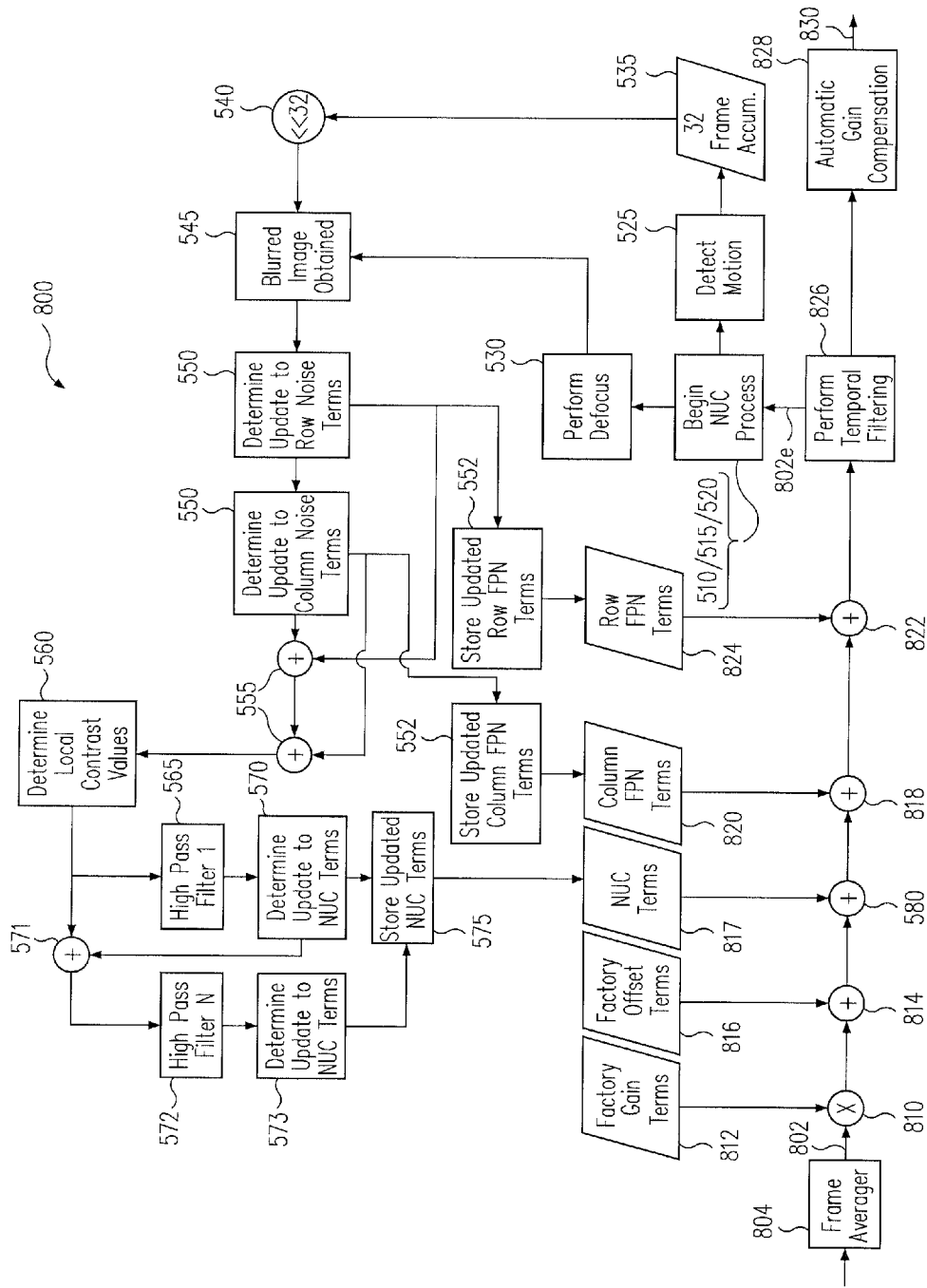
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
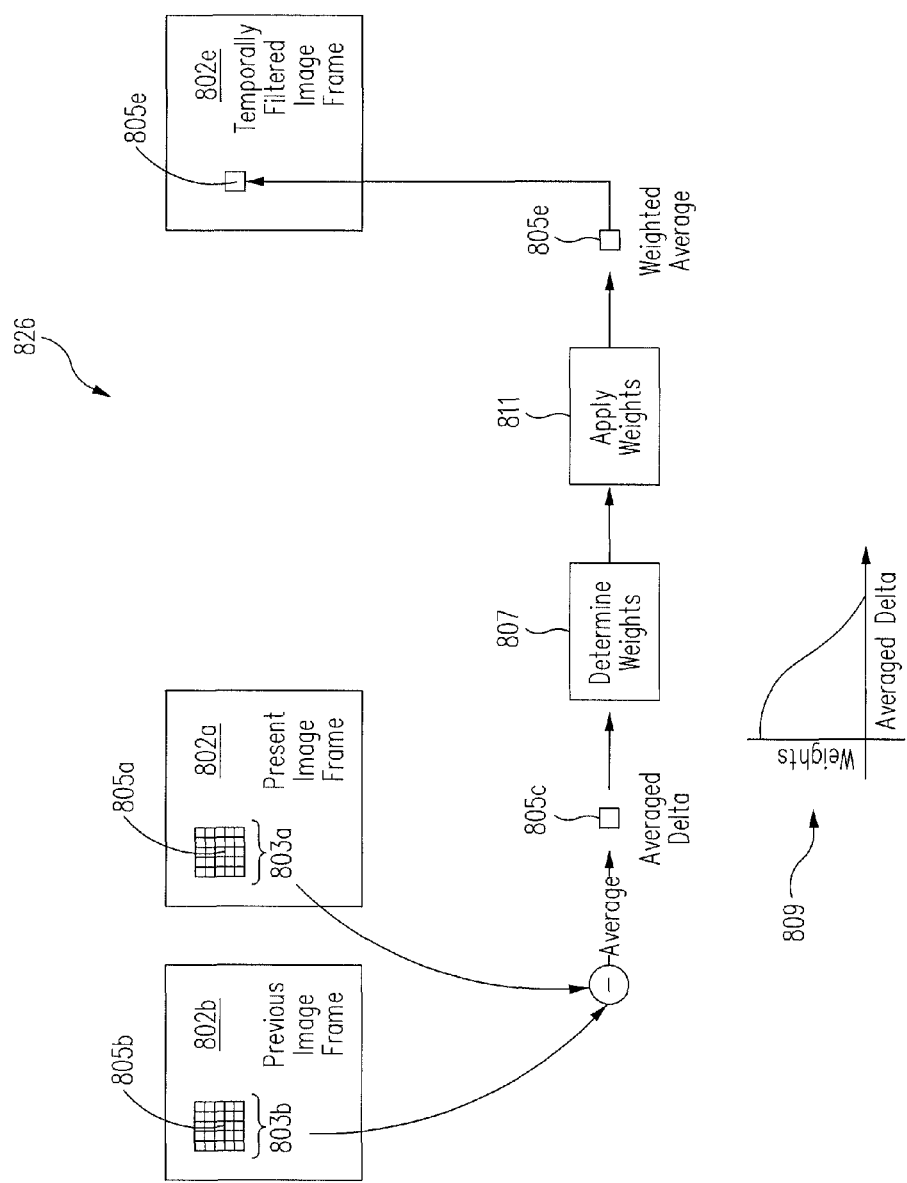
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
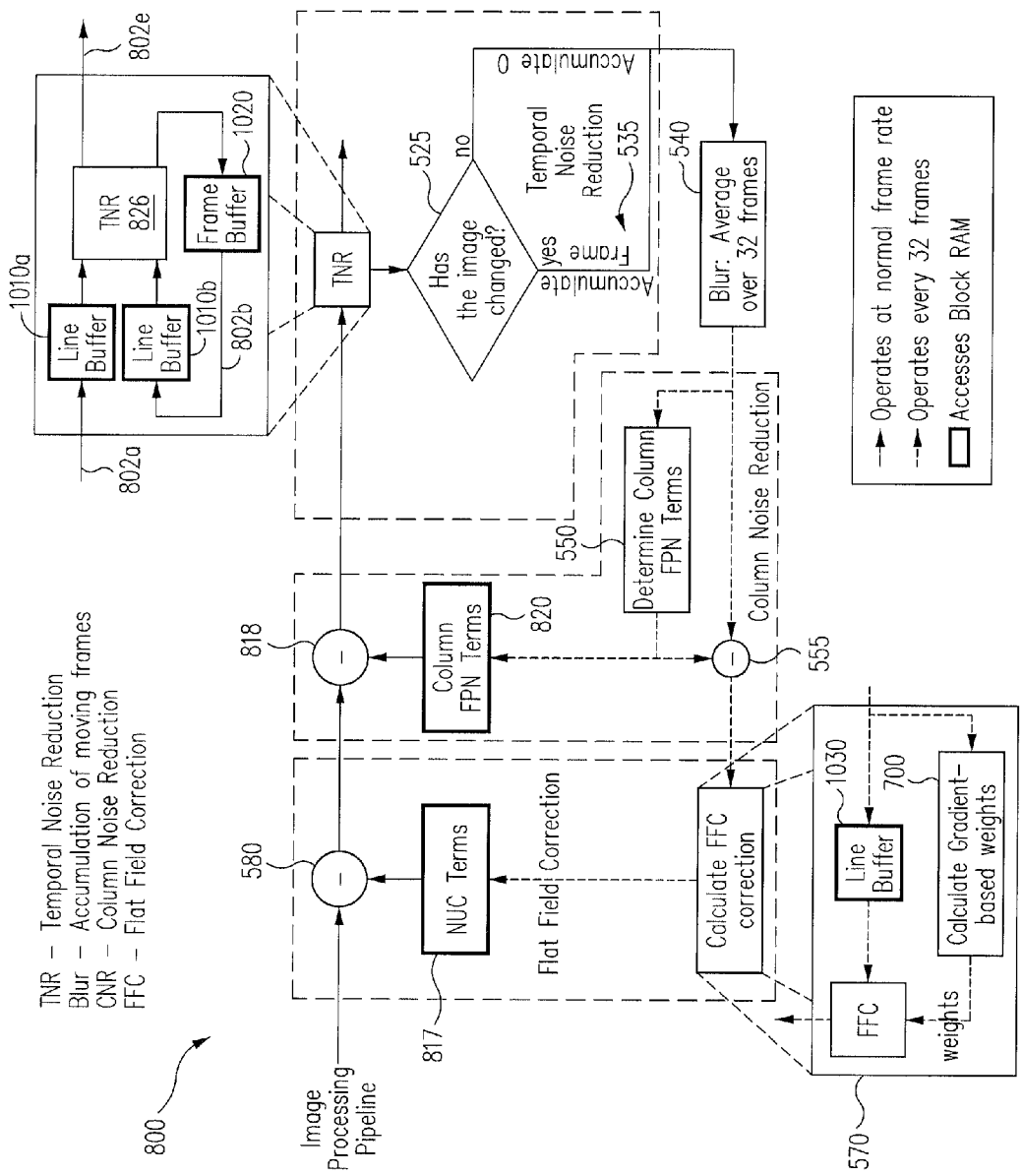
FIG. 10 illustrates particular implementation details of several processes of the image processing pipeline of FIG. 6 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is ⅟32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

Figure 12:
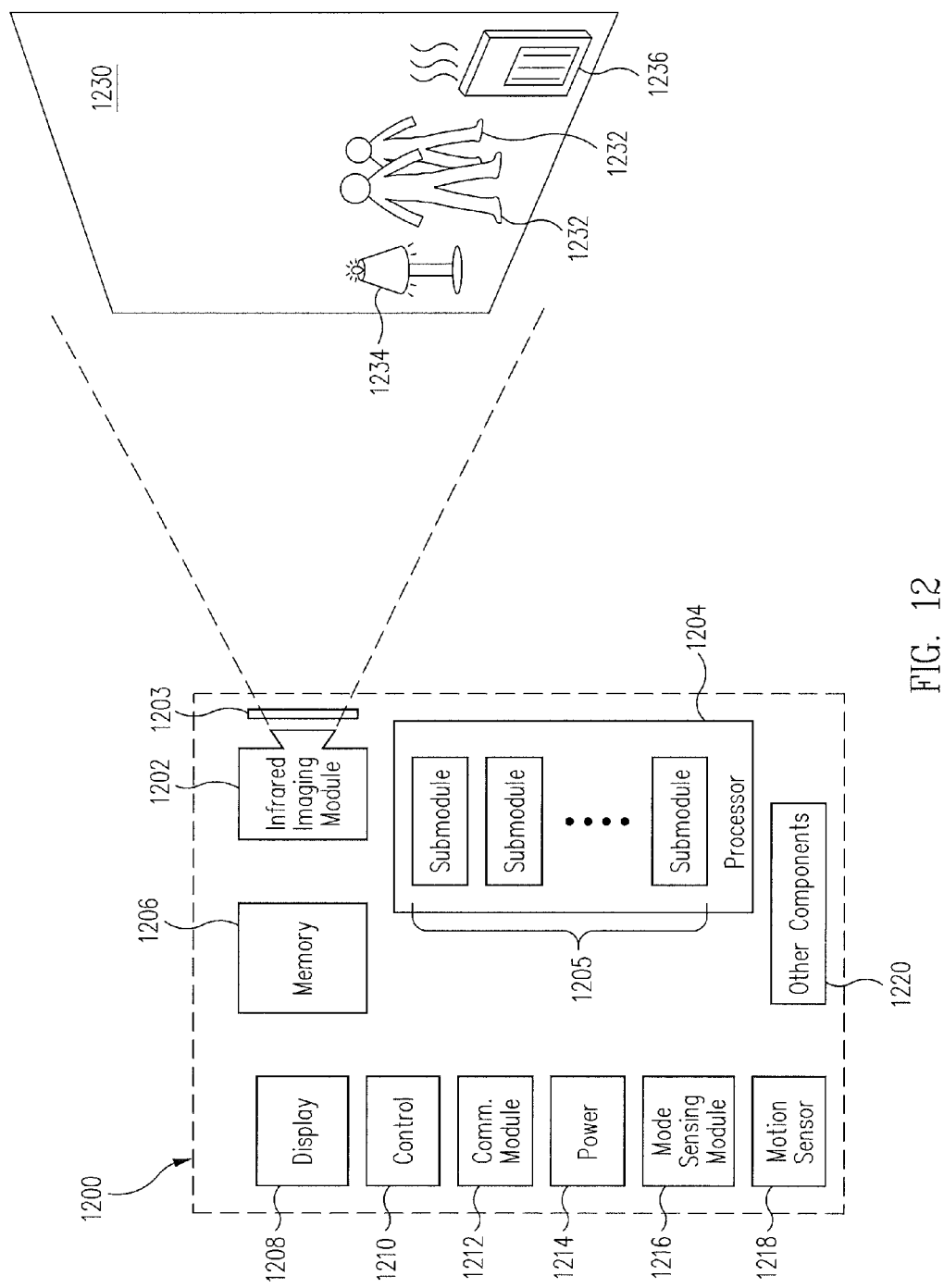
FIG. 12 illustrates a block diagram of a monitor and control system for enhancing occupant safety and energy efficiency in accordance with one embodiment of the disclosure.

Referring now to FIG. 12, a block diagram is shown of a monitor and control system 1200 for enhancing occupant safety and energy efficiency in accordance with an embodiment of the disclosure. System 1200 may include one or more infrared imaging modules 1202, a processor 1204, a memory 1206, a display 1208, a control module 1210, a communication module 1212, a power module 1214, a mode sensing module 1216, and/or motion sensors 1218. In various embodiments, system 1200 may include one or more other components 1220, which may include various types of sensors such as a humidity sensor, a water level sensor, a gaseous fume sensor, etc. In various embodiments, the various components of system 1200 may be implemented in the same or similar manner as corresponding components of host device 102 of FIG. 1. Moreover, the various components of system 1200 may be configured to perform various NUC processes and other processes described herein.

Infrared imaging module 1202 may be a small form factor infrared camera or a small form factor infrared imaging device implemented in accordance with various embodiments disclosed herein. Infrared imaging module 1202 may be configured to capture, process, and/or otherwise manage infrared images (e.g., including thermal images) of a scene 1230, and provide such images to processor 1204. Infrared imaging module 1202 may include an FPA implemented, for example, in accordance with various embodiments disclosed herein or others where appropriate.

Optionally, infrared imaging module 1202 may include one or more filters 1203 that may be adapted to pass infrared radiation of certain wavelengths (e.g., short-wave infrared (SWIR) filter, mid-wave infrared (MWIR) filter, long-wave infrared (LWIR) filter). Filters 1203 may be utilized to tailor infrared imaging module 1202 for increased sensitivity to a desired range of infrared wavelengths. For example, when used to detect a gas leak as further described herein, infrared imaging module 1202 may be better suited to detect a certain type of gas by using an appropriate filter. In some embodiments, filters 1203 may be selectable (e.g., a selectable filter wheel). In other embodiments, filters 1203 may be fixed as appropriate for a desired usage of infrared imaging module 1202.

Processor 1204 may be implemented as any appropriate processing device as described with regard to processor 195 in FIG. 1. Processor 1204 may be adapted to interface and communicate with other components of system 1200 to perform methods and processes described herein. Processor 1204 may include one or more submodules 1205 for operating in one or more modes of operation, wherein submodules 1205 may be adapted to define preset processing, displaying, and/or controlling functions that may be embedded in processor 1204 or stored on memory 1206 for access and execution by processor 1204. For example, processor 1204 may be adapted to perform various processes for detecting the presence of hazardous chemicals or conditions, such as a natural gas leak, carbon monoxide (CO), volatile organic compound, fire, smoke, etc., and generating appropriate control signals and/or alarms. In another example, processor 1204 may be adapted to perform various processes for monitoring and controlling energy usage in an area. In yet another example, processor 1204 may be adapted to perform various processes for monitoring and reporting persons in need of assistance. In yet another example, processor 1204 may be adapted to perform various processes for detecting intruders. In various embodiments, processor 1204 may be adapted to perform various types of image processing algorithms and/or various modes of operation, as described herein.

It should be appreciated that each of the submodules 1205 may be integrated in software and/or hardware as part of processor 1204, or code (e.g., software or configuration data) for each mode of operation associated with each of the submodules 1205 may be stored in memory component 1206. Embodiments of submodules 1205 (i.e., modes of operation) disclosed herein may be stored by a separate computer-readable medium (e.g., a non-transitory memory, such as a hard drive, a compact disk, a digital video disk, or a flash memory) to be executed by a computer (e.g., logic or processor-based system) to perform various methods disclosed herein. In one example, the computer-readable medium may be portable and/or located separate from system 1200, with stored submodules 1205 provided to system 1200 by coupling the computer-readable medium to system 1200 and/or by system 1200 downloading (e.g., via a wired or wireless link) submodules 1205 from the computer-readable medium (e.g., containing the non-transitory information).

In various embodiments, submodules 1205 may be utilized by system 1200 to perform one or more different modes of operation. System 1200 may operate in many different modes simultaneously, for example by performing many modes of operation in parallel, through multitasking, or otherwise in a current manner. The modes of operation are described in greater detail herein. In various embodiments, as described herein, submodules 1205 provide for improved thermal image processing techniques for real time applications associated with different modes of operation, such as the power usage monitoring and control mode of operation, the hazardous condition monitoring mode of operation, the energy efficiency monitoring mode of operation, the rescue assistance mode of operation, the intruder detection mode of operation, and other modes of operation that may be supported by system 1200.

Memory 1206 may include one or more memory devices to store data and information, including thermal image data and information and thermal video image data and information. The one or more memory devices may include various types of memory for thermal image and video image storage including volatile and non-volatile memory devices, such as RAM (Random Access Memory), ROM (Read-Only Memory), EEPROM (Electrically-Erasable Read-Only Memory), flash memory, etc. In one embodiment, processor 1204 is adapted to execute software stored on memory component 1206 to perform various methods, processes, and modes of operations in manner as described herein.

Display 1208 may include an image display device (e.g., a liquid crystal display (LCD)) or various other types of generally known video displays or monitors. Processor 1204 may be adapted to display image data and information on display 1208. Processor 1204 may be adapted to retrieve image data and information from memory 1206 and display any retrieved image data and information on display 1208. Display 1208 may include display logic, which may be utilized by processor 1204 to display image data and information (e.g., captured and/or processed thermal images). Display 1208 may receive image data and information directly from infrared imaging modules 1202 via processor 1204, or the image data and information may be transferred from memory 1206 via processor 1204.

In one embodiment, processor 1204 may initially process a captured image in one or more modes, corresponding to submodules 1205. The processed image may be used by the processor 1204 to determine the appropriate action to take for the different modes of operations. In one embodiment, the processed image for one mode may be presented to display 1208 for viewing. Upon user input to control module 1210, processor 1204 may present the processed image for a different mode to display 1208 for viewing. In various aspects, display 1208 may be remotely positioned, and processor 1204 may be adapted to remotely display image data and information on display 1208 via wired or wireless communication with display 1208.

Control module 1210 may include a user input and/or interface device having one or more user actuated components. For example, actuated components may include one or more push buttons, slide bars, rotatable knobs, and/or a keyboard, that are adapted to generate one or more user actuated input control signals. Control module 1210 may be adapted to be integrated as part of display 1208 to function as both a user input device and a display device. For example, control module 1210 may include a graphical user interface (GUI), which may be integrated as part of display 1208 (e.g., a user actuated touch screen), having one or more images of the user-activated mechanisms (e.g., buttons, knobs, sliders, etc.), which are adapted to interface with a user and receive user input control signals via display 1208. Processor 1204 may be adapted to sense control input signals from control module 1210 and respond to any sensed control input signals received therefrom.

Control module 1210 may include, in one embodiment, a control panel unit (e.g., a wired or wireless handheld control unit) having one or more user-activated mechanisms (e.g., buttons, knobs, sliders, etc.) adapted to interface with a user and receive user input control signals. In various embodiments, the user-activated mechanisms of the control panel unit, as well as the user-activated mechanisms of the GUI, may be utilized to select one or more modes of operation, as described herein in reference to submodules 1205. In addition, the user-activated mechanisms may be utilized to control and set various parameters of the selected modes of operation, such as detection targets (e.g., type of gas leak to detect), detection sensitivity (e.g., number of persons and duration of stay to trigger power-saving operations), devices to control, desired temperature settings, etc. In other embodiments, it should be appreciated that the control panel unit may be adapted to include one or more other user-activated mechanisms to provide various other control functions of system 1200, such as auto-focus, menu enable and selection, field of view (FOV), brightness, contrast, gain, offset, spatial, temporal, and/or various other features and/or parameters. In still other embodiments, a variable gain signal may be adjusted by the user or operator based on a selected mode of operation.

Communication module 1212 may include a network interface component (NIC) adapted for wired and/or wireless communication with a network and with other devices connected to the network. Through communication module 1212, processor 1204 may control power or operation of devices (e.g., heaters, air conditioning units, lamps, kitchen appliances, etc.) connected to the network. In this regard, communication module 1212 may support various interfaces, protocols, and standards for home and building automation networking, such as the X10 standard, the Building Automation and Control Networks (BACNet) protocol, the S-Bus protocol, the C-bus protocol, the CEBus protocol, the ONE-NET standard, etc. Control signals to devices may be transmitted from communication module 1212 directly to devices using such standards, or may be transmitted to a central controller (e.g., a conventional building control panel for centrally controlling and monitoring HVAC, lighting, power, water, and/or building access) that relays and distributes the control signals to various devices under its control.

In some embodiments, communication module 1212 may provide a proprietary interface and/or protocol for controlling power and/or operation of various devices. Such a proprietary interface and/or protocol may be based on the various types of wired and wireless networking technology supported by communication module 1212 as described below.

In various embodiments, communication module 1212 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components, such as wireless transceivers, adapted for communication with a wired and/or wireless network. As such, communication module 1212 may include an antenna coupled thereto for wireless communication purposes. In other embodiments, the communication module 1212 may be adapted to interface with a wired network via a wired communication component, such as a DSL (e.g., Digital Subscriber Line) modem, a PSTN (Public Switched Telephone Network) modem, an Ethernet device, a cable modem, a power-line modem, etc. for interfacing with DSL, Ethernet, cable, optical-fiber, power-line and/or various other types wired networks and for communication with other devices on the wired network. Communication module 1212 may be adapted to transmit and/or receive one or more wired and/or wireless video feeds.

In various embodiments, the network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, system 1200 may be associated with a particular network link such as for example a URL (Uniform Resource Locator), an IP (Internet Protocol) address, and/or a mobile phone number.

Power module 1214 comprises a power supply or power source adapted to provide power to system 1200 including each component of system 1200. Power module 1214 may comprise various types of power storage devices, such as battery, or a power interface component that is adapted to receive external power and convert the received external power to a useable power for system 1200.

Mode sensing module 1216 may be optional. Mode sensing module 1216 may include, in one embodiment, an application sensor adapted to automatically sense a mode of operation, depending on the sensed application (e.g., intended use for an embodiment), and provide related information to processor 1204. In various embodiments, the application sensor may include a mechanical triggering mechanism (e.g., a clamp, clip, hook, switch, push-button, etc.), an electronic triggering mechanism (e.g., an electronic switch, push-button, electrical signal, electrical connection, etc.), an electro-mechanical triggering mechanism, an electro-magnetic triggering mechanism, or some combination thereof. For example, mode sensing module 1216 may sense a mode of operation corresponding to the intended application of the infrared imaging system 100 based on the type of mount (e.g., accessory or fixture) to which a user has coupled system 1200 or one or more of its components (e.g., infrared imaging module 1202). In such embodiments, mode sensing module 1216 may, for example, sense that system 1200 is intended for the power usage monitoring and control mode of operation by sensing that infrared imaging module 1202 is mounted in a conference room. The mode of operation may also be provided via control module 1210 by a user of system 1200, in one or more embodiments. For example, a user may put system 1200 in an intruder detection mode of operation at night or when leaving, through actuated components and/or GUI of control module 1210. In this regard, control module 1210 may be configured to permit a user to set a timer for activating certain modes of operation (e.g., intruder detection mode) at certain times (e.g., at night, weekends, or when vacating premises).

Mode sensing module 1216, in one embodiment, may include a mechanical locking mechanism adapted to secure system 1200 to a structure or part thereof and may include a sensor adapted to provide a sensing signal to processor 1204 when system 1200 is mounted and/or secured to the structure. Mode sensing module 1216, in one embodiment, may be adapted to receive an electrical signal and/or sense an electrical connection type and/or mount type and provide a sensing signal to processor 1204.

In various embodiments, mode sensing module 1216 may be adapted to provide data and information relating to various system applications including various coupling implementations associated with various types of structures (e.g., buildings, bridges, tunnels, vehicles, etc.). In various embodiments, mode sensing module 1216 may include communication devices that relay data and information to processor 1204 via wired and/or wireless communication. For example, mode sensing module 1216 may be adapted to receive and/or provide information through a satellite, through a local broadcast transmission (e.g., radio frequency), through a mobile or cellular network, and/or through information beacons in an infrastructure (e.g., a transportation or highway information beacon infrastructure) or various other wired and/or wireless techniques. Thus, for example, mode sensing module 1216 may receive a notification of an emergency through various networks, and relay the notification to processor 1204 so that system 1200 may operate in a rescue assistance mode (e.g., monitoring and reporting of persons in need of assistance) in case of an emergency.

Motion sensors 1218 may be implemented in the same or similar manner as described with regard to motion sensors 194 in FIG. 1. Motion sensors 1218 may be monitored by and provide information to infrared imaging module 1202 and/or processor 1204 for performing various NUC techniques described herein.

In various embodiments, one or more components of system 1200 may be combined and/or implemented or not, as desired or depending on application requirements, with system 1200 representing various functional blocks of a system. For example, processor 1204 may be combined with infrared imaging module 1202, memory 1206, display component 1208, and/or mode sensing module 1216. In another example, processor 1204 may be combined with infrared imaging sensor 1202 with only certain functions of processor 1203 performed by circuitry (e.g., processor, logic device, microprocessor, microcontroller, etc.) within infrared imaging module 1202. In still another example, control module 1210 may be combined with one or more other components or be remotely connected to at least one other component, such as processor 1204, via a wired or wireless control device so as to provide control signals thereto.

System 1200 may include a permanently mounted infrared imaging module 1202 coupled, for example, to various types of structures (e.g., buildings bridges, tunnels, etc.). System 1200 may include a portable infrared imaging module and may be implemented, for example, as a handheld device and/or coupled, in other examples, to various types of vehicles (e.g., land-based vehicles, watercraft, aircraft, spacecraft, etc.) or structures via one or more types of mounts.

During normal operation, system 1200 may be adapted to analyze infrared radiation captured by infrared imaging modules 1202 to detect heat source such as a person, an appliance in use, a fire, or to detect gas, carbon monoxide, or other chemicals in the area being monitored. The infrared imaging system 1200 may also provide a live video feed of thermal images captured with infrared imaging modules 1202 through a wired cable link or wireless communication link. Captured video images may be utilized for surveillance operations. In one embodiment, radiometric calibration allows the system 1200 to detect for the presence and the number of objects in image 1230 (e.g., persons 1232, appliances 1234 and 1236) emitting heat in particular temperature ranges. In one embodiment, system 1200 may analyze the spectral content and intensity pattern of infrared emission to detect gas, or other chemicals that may a pose a hazard.

In one embodiment, processor 1204 utilizes one or more submodules 1205 configured as a person detection submodule to determine or provide awareness of whether one or more persons are present in scene 1230, such as persons 1232. If at least one person is present, then system 1200 may be adapted to determine the number of persons and to control lighting (e.g., a lamp 1234), HVAC system (e.g., a heater/AC unit 1236) in the area being monitored. The control for the lighting, HVAC system may be transmitted through communication module 1212 to a network.

In one embodiment, processor 1204 utilizes one or more submodules 1205 configured as a person detection submodule to determine whether one or more persons are present in scene 1230, such as persons 1232. If at least one person is present, then processor 1204 may further determine whether the person or persons may need assistance. The determination may be based at least on the person's posture (e.g., standing up or fallen down), and may also be based on other attributes such as the body temperature and/or the duration for which the person remained motionless. In an event of an emergency (e.g., earthquake, fire, and other disasters), processor 1204 may transmit information including the location of detected persons and whether the persons may need of assistance. Such information may be transmitted through communication module 1212 to a network, so that emergency responders may access the information to locate rescuees and plan a rescue operation (e.g., prioritize rescuees based on the indication of whether they may need assistance).

Figures 13A, 13B:
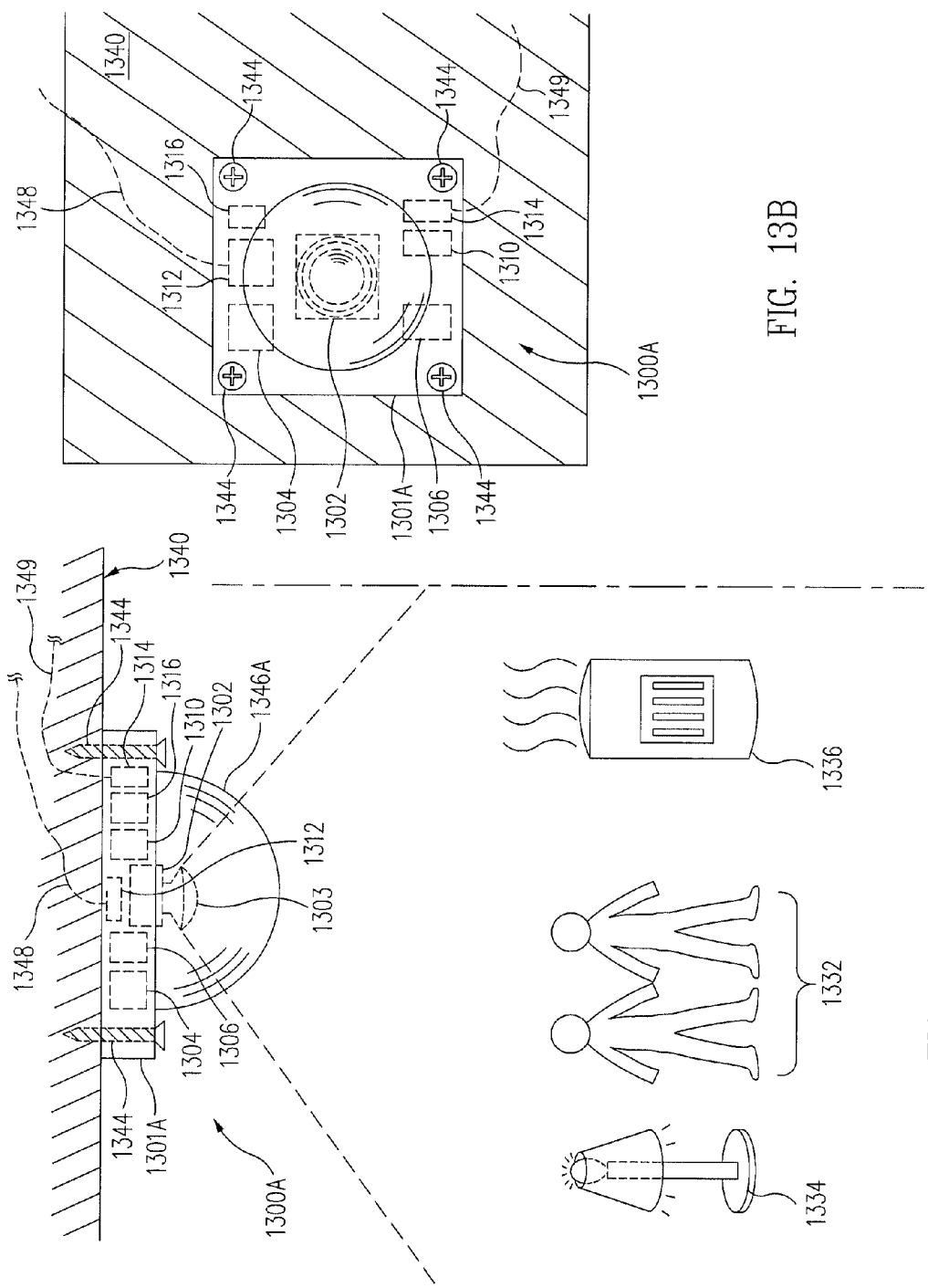
FIGS. 13A-13B illustrate various schematic views of a monitor and control system for enhancing occupant safety and energy efficiency in accordance with another embodiment of the disclosure.
Figure 13C:
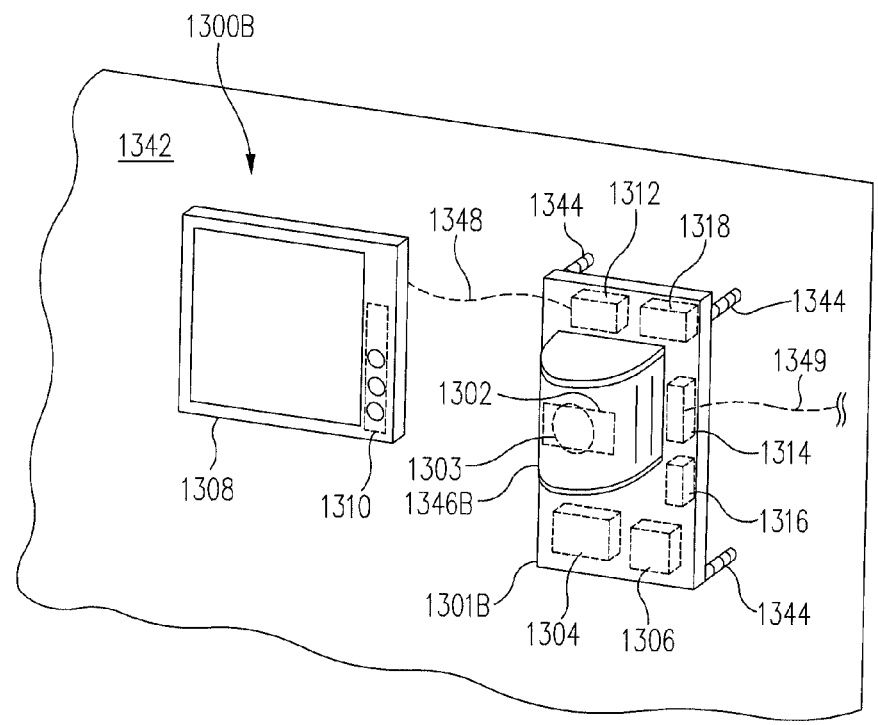
FIGS. 13C-13D illustrate various schematic views of a monitor and control system for enhancing occupant safety and energy efficiency in accordance with yet another embodiment of the disclosure.
Figure 13D:
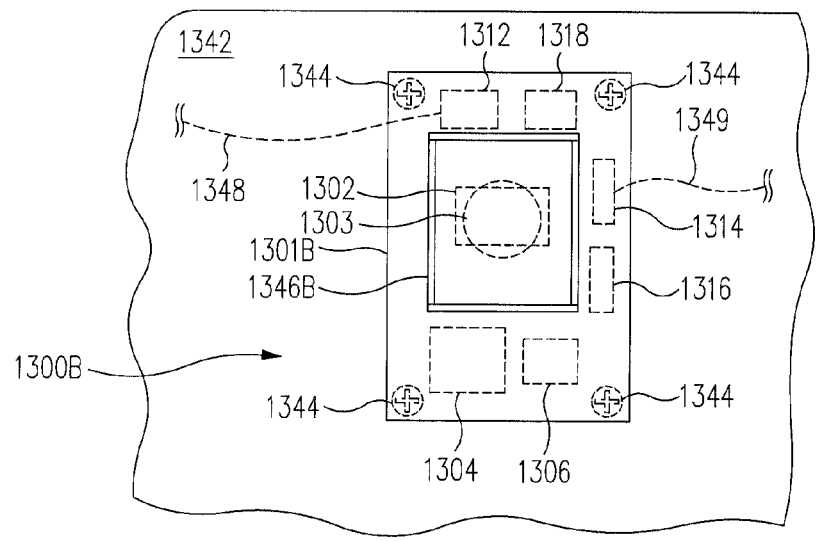

FIGS. 13A-13D illustrate various views of various building-mountable monitoring and controlling systems 1300A and 1300B for enhancing occupant safety and energy efficiency in accordance with various embodiments of the disclosure. More specifically, FIG. 13A-13B are a side schematic view and a bottom schematic view, respectively, of system 1300A having a ceiling-mountable portion, and FIG. 13C-13D are a perspective schematic view and a front schematic view, respectively, of system 1300B having a wall-mountable portion.

System 1300A/1300B may include one or more infrared imaging modules 1302, a processor 1304, a memory 1306, a display 1308, a control module 1310, a communication module 1312, a power module 1314, and/or a mode sensing module 1316, and/or motion sensors 1318, all of which may be implemented in the same or similar manner as the corresponding components of system 1200 of FIG. 12.

System 1300A may comprise an enclosure 1301A that houses at least one infrared imaging module 1302, and may optionally house other components of system 1300A. Enclosure 1301A can be mounted, attached, or otherwise coupled to a ceiling 1340 via a set of suitable fasteners 1344 (e.g., screws, bolts, hooks, etc.), so that infrared imaging module looks down on the objects (e.g., persons 1332, lighting equipment 1334, an HVAC unit 1336) in the space below (e.g., a room). In this regard, infrared imaging module 1302 may be coupled to a lens unit 1303 having a wide field of view (FOV), including a fish-eye lens or omni-directional lens, that helps to expand the area covered by infrared imaging module 1302. Enclosure 1301A may further comprise a lens shield 1346A adapted to pass infrared radiation through to infrared imaging module 1302, which may be shaped as a dome, hemisphere, fish-eye, or other shape suitable for use with a wide FOV. For example, lens shield 1346A may be implemented using an infrared-transmissive dome disclosed in commonly assigned U.S. patent application Ser. No. 12/721,870, filed Mar. 11, 2010, the entire content of which is incorporated herein by reference.

Similarly, system 1300B may comprise an enclosure 1301B that houses at least one infrared imaging module 1302 and optionally other components of system 1300B. Enclosure 1301B can be mounted, attached, or otherwise coupled to a wall 1342 via a set of suitable fasteners 1344. Similar to lens shield 1346A, lens shield 1346B is adapted to pass infrared radiation through to infrared imaging module 1302 and shaped suitably to use with a wide FOV. For example, lens shield 1346B may be constructed using methods disclosed in commonly assigned U.S. patent application Ser. No. 12/721,870 referenced above.

In one embodiment, display 1308 may be separate from enclosure 1301A/1301B, and communicatively coupled to communication module 1312 via wired link 1348 or wireless link. Display may optionally include control module 1310 with a control panel similar to control module 1210 described above in connection with FIG. 12. In another embodiment, a conventional building control panel (e.g., control panel for centrally controlling and monitoring HVAC, lighting, power, and/or building access status) well-known in the art of building automation may provide some of the functionality of a display and a control module. System 1301A/1301B may communicate with such a building control panel via communication module 1312 and wired or wireless link.

System 1300A/1300B may use a battery (e.g., a lithium battery) and, therefore, not require an external power source. Alternately, system 1300A/1300B may draw power via wire 1349 from the power wiring already embedded in a building.

It should be appreciated that all or part of system 1200/1300A/1300B may be fixedly or removably attached or mounted to any other component (e.g., beams, doors, pillars) of various types of structures (e.g., buildings, bridges, garages) and vehicles, as discussed above with respect to FIG. 12. It should also be appreciated that system 1200/1300A/1300B may be implemented as a networked system of sensors, as described in further detail with respect to FIG. 14.

Figure 14:
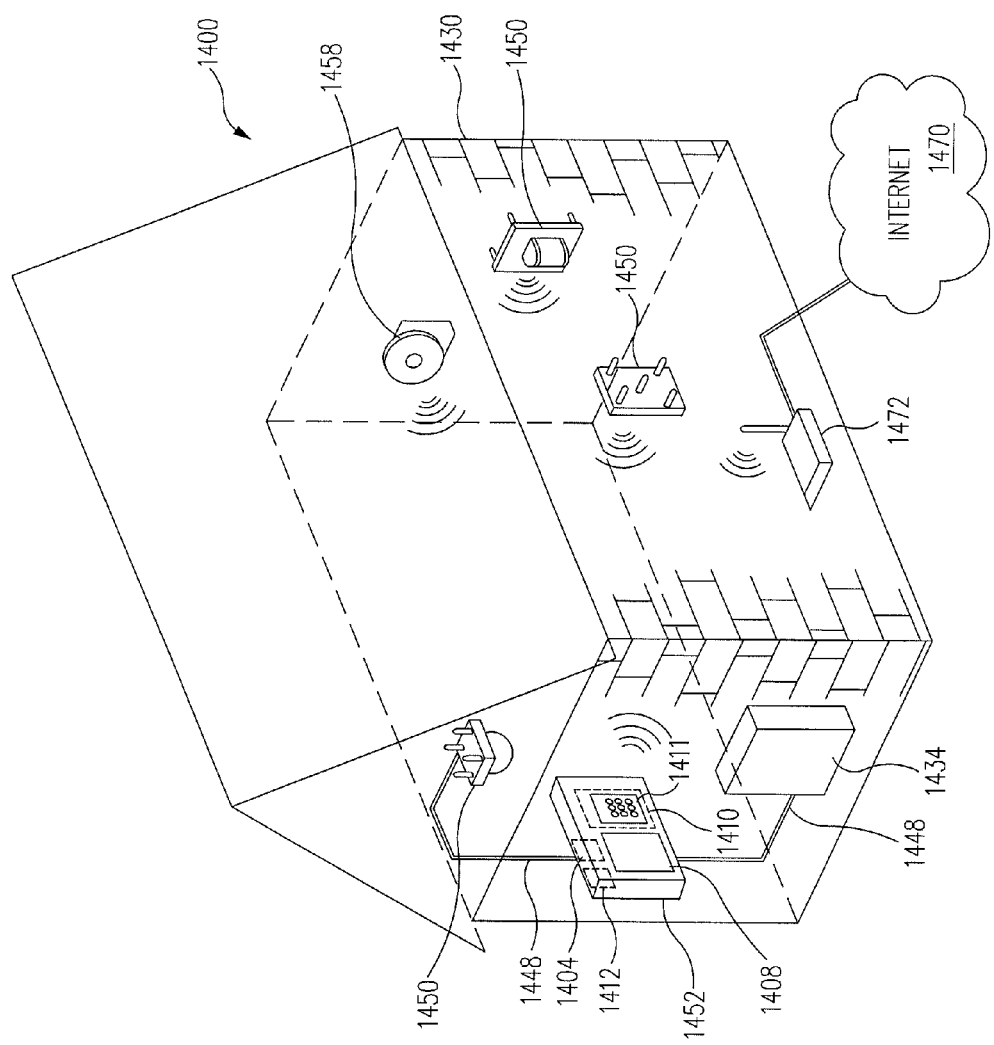
FIG. 14 illustrates a schematic view of a network system for monitoring and controlling of a structure in accordance with an embodiment of the disclosure.

FIG. 14 illustrates a schematic view of a networked system 1400 for monitoring and controlling of a structure 1430 to enhance occupant safety and energy efficiency in accordance with various embodiments of the disclosure. Various components of networked system 1400 may be implemented in a similar or same manner as the corresponding components of system 1200/1300A/1300B.

As shown, in one or more embodiments, networked system 1400 utilizes a plurality of various monitoring devices 1450, which may include the wall-mountable or ceiling-mountable portions of system 1300A and 1300B. Monitoring devices 1450 may be attached to a wall, ceiling, baseboard, cabinet, or anywhere a wide field of view of a desired area may be achieved. Each monitoring device 1450 has at least one infrared imaging module that can capture a thermal image of the scene covered by its FOV.

In one embodiment, networked system 1400 also includes a base unit 1452 that functions as a receiver/processor for all monitoring devices 1450. In this regard, base unit 1452 may comprise at least a processor 1404 and a communication module 1412. Base unit 1452 may be adapted to record data, process data, and transmit data (e.g., in real time) to a hosted website for remote viewing and retrieval by a user, for example, by emergency responders to access information including the location of all persons remaining in premises and whether they may be in need of assistance. Each monitoring device 1450 communicates with base unit 1452 and/or with each other via a wired link 1448 or a wireless link.

Base unit 1452 may control power or operation of power-consuming devices 1434 (e.g., heaters, air conditioners, lighting equipment, kitchen appliances, TV, audio equipment, etc.) connected to it via network to provide a more energy efficient operation of such devices, as further described herein. As described above with respect to communication module 1212 of FIG. 12, base unit 1452 may communicate with devices 1434 via various standardized interfaces and protocols, or it may utilize a proprietary interface and protocols.

Base unit 1452 may also be configured to sound one or more alarms 1458 connected to it via network, in case a hazardous condition is detected using processes further described herein. For example, monitoring devices 1450 may be distributed throughout structure 1430 to detect fire, gas leak, CO, and/or flood. If such hazardous conditions are detected, networked system 1400 provides an alarm (e.g., activating alarms 1458, an email alert, a text message, and/or any other desired form of communication for a desired warning) to warn occupants and notify appropriate personnel (e.g., the fire department).

Base unit 1452 may further include a display 1408 and a control module 1410 with a control panel 1411 that allow users to view real time readings on site and toggle between monitoring devices in different locations of structure 1430. Display 1408 may comprise a touch-sensitive screen for improved usability. As described in connection with display 1208 and control module 1210 of FIG. 12, display 1408 and control panel 1411 may include various user-activated mechanisms (e.g., buttons, dials, sliders, etc.) that may be utilized to select and/or input various parameters, including a mode of operation, of system 1400. Base unit 1452 may further include a USB and/or SD card slot for transferring data onsite without the use of a laptop or PC.

In another embodiment, some of the functionality of a base unit may be provided at a conventional building control panel, as described above in connection with FIGS. 12-13D. For example, display screens and various user-activated mechanisms of a building control panel may be shared and utilized by system 1400. In addition, such a building control panel may relay and distribute control signals from communication module 1412 of system 1400 to various devices under its control.

After installation of base unit 1452 and monitoring devices 1450, any related software may be loaded onto a laptop, or use of a full-featured website may allow the user to configure reporting intervals and determine thresholds, and/or set readings desired for remote viewing. Configuration may be done onsite or remotely and settings may be changed at any time from the website interface, as would be understood by one skilled in the art. Networked system 1400 may be secured with login credentials, such as a user identification and password permitting access to only certain persons. Real time data may be automatically downloaded and stored to a server for future viewing. Networked system 1400 may provide for full access to system configuration settings, customizable thresholds and alarms, user access management (e.g., add, remove, and/or modify personnel access), and alerts the user or operator via cell phone, text message, email, etc., as would be understood by one skilled in the art.

Networked system 1400 may include an Internet connection adapted to transmit data from base unit 1452 (e.g., communication module 1412) in real-time via the Internet to a website for monitoring, analysis, and downloading. This may be achieved by a LAN/WAN, or may require an internal wireless telecommunication system, such as a cellular-based (e.g., 3G or 4G) wireless connection for continuous data transmission. In one embodiment, thermal images and data may be collected locally via processor 1404 and then sent to a hosted website over an external network 1470 (e.g., the Internet) via a gateway 1472 (e.g., a wired or wireless router and/or modem) for remote viewing, control, and/or analysis. As such, networked system 1400 may utilize networkenabled, multi-point monitoring technology to collect a breadth of quality thermal images and data for monitoring and protection of various types of structures in a scalable manner.

Figure 15:
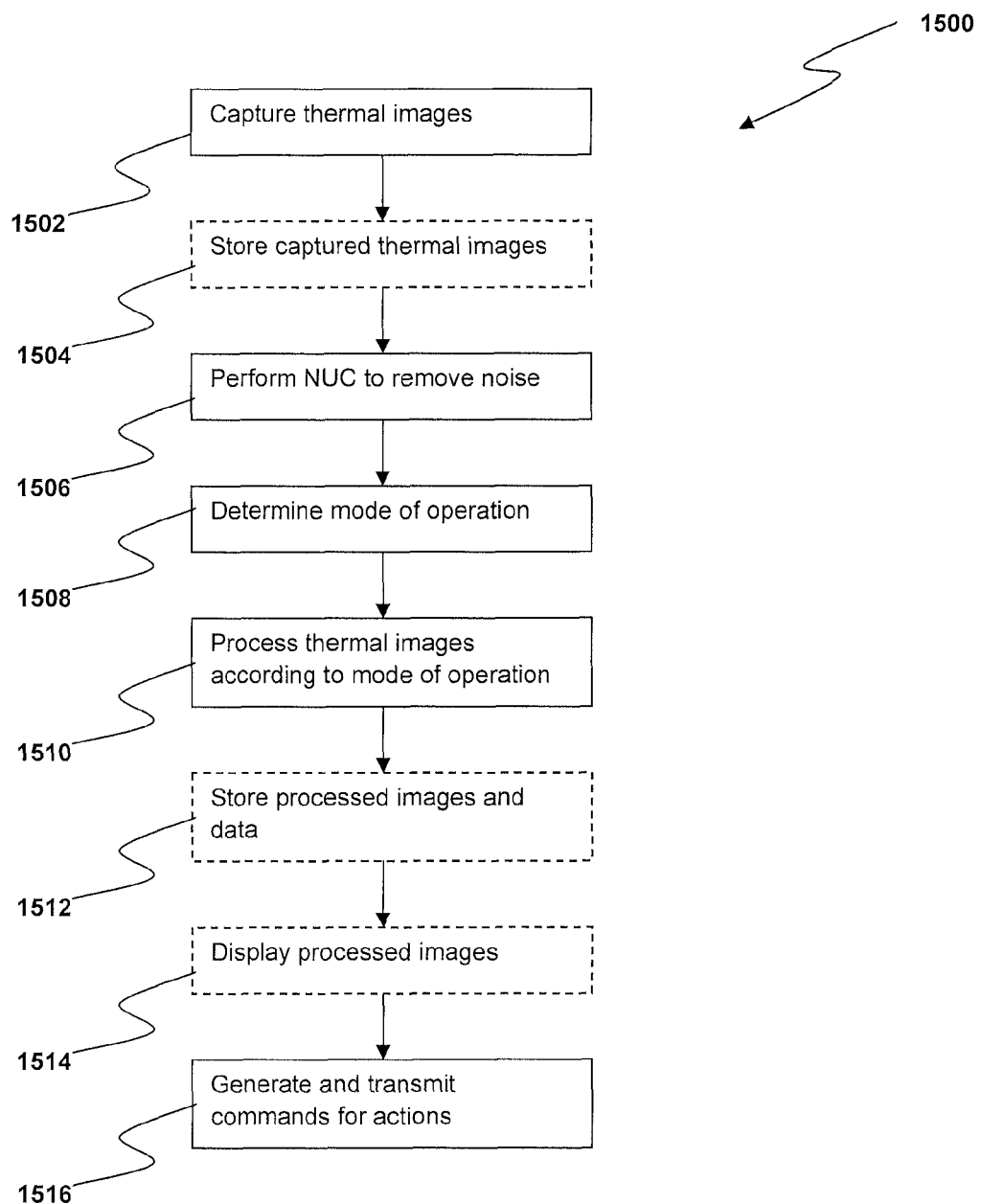
FIG. 15 illustrates a flowchart of a process for monitoring and controlling to enhance occupant safety and energy efficiency in accordance with an embodiment of the disclosure.

Referring now to FIG. 15, a flowchart is illustrated of a process 1500 for monitoring and controlling to enhance occupant safety and energy efficiency, in accordance with an embodiment of the disclosure. For purposes of describing process 1500, references may be made to systems 1200, 1300A, 1300B, and/or 1400 of FIGS. 12-14, merely as an example of systems and components that may perform process 1500. It should be appreciated that any other suitable systems and components may perform all or part of process 1500.

At block 1502, one or more thermal images of scene 1230 may be captured by one or more infrared imaging modules 1202/1302. The one or more thermal images may be received, for example, at processor 1204/1304/1404 that is communicatively coupled via wired or wireless link to one or more infrared imaging modules 1202/1302. In some embodiments, the captured thermal images optionally may be stored in memory (e.g., memory 1206/1306) at block 1504. At block 1506, a NUC process may be performed to remove noise from the thermal images, for example, by using various NUC techniques disclosed herein.

For one or more embodiments, a mode of operation may be determined at block 1508, and the one or more captured thermal images may be processed according to the determined mode of operation at block 1510. In one embodiment, the mode of operation may be determined before or after the thermal images are captured and/or preprocessed (blocks 1502 and/or 1506), depending upon the types of infrared detector settings (e.g., biasing, frame rate, signal levels, etc.), processing algorithms and techniques, and related configurations.

In one embodiment, for example, the mode of operation may be defined by mode sensing module 1216/1316, wherein an application sensing portion of mode sensing module 1216/1316 may be adapted to automatically sense the mode of operation, and depending on the sensed application, mode sensing module 1216/1316 may be adapted to provide related data and/or information to processor 1204/1304/1404. In another embodiment, the mode of operation may be manually set by a user via display 1208/1308/1408 and/or control module 1210/1310/1410 without departing from the scope of the present disclosure. In yet another embodiment, the mode of operation may be set automatically by processor 1204/1304/1404 if certain conditions are detected by various monitoring operations further described herein. For example, if fire, smoke, flood, or other hazardous condition is detected by system 1200/1300A/1300B/1400 operating in a hazardous condition detection mode, the mode of operation may be automatically switched to a rescue assistance mode to generate and provide information indicating where people are in a premise and whether they may need assistance.

In various embodiments, the modes of operation refer to processing of thermal images, and in response to the processed images, controlling operation of one or more devices, generating reports, issuing warnings, and/or displaying of infrared images. In some embodiments, thermal image processing algorithms are utilized to process an image under a variety of conditions, and the thermal image processing algorithms provide the user with one or more options to tune parameters and operate a monitoring and controlling system (e.g., system 1200/1300A/1300B/1400) in an automatic mode or a manual mode. In various embodiments, the modes of operation are provided by the monitoring and controlling system, and thermal image processing for different use conditions may be implemented in various types of structure applications and resulting use conditions. In various embodiments, the modes of operation may include a power usage monitoring and control mode of operation, a hazardous condition monitoring mode of operation, an energy efficiency monitoring mode of operation, a rescue assistance mode of operation, and an intruder detection mode of operation. The monitoring and controlling system may be configured to simultaneously operate in any desired combination of such modes.

After processing the one or more thermal images according to the determined mode of operation, at block 1512 the one or more processed images and accompanying data may optionally be stored, and at block 1514, may optionally be displayed. Additionally, in response to the results of processing in block 1510, commands for actions to be taken, such as changing power or operation of one or more devices, instituting corrective action to mitigate hazardous conditions, generating alerts, and issuing reports, etc., may be generated at block 1516. The generated command or control signals may then be transmitted to one or more devices to be controlled. For example, as described above in connection with FIGS. 12-14, the control signals may be transmitted from communication module 1212/1312/1412, directly to the one or more devices via wired/wireless link, or to a conventional building control panel that relays and/or distributes the control signals to devices under its control.

Figure 16:
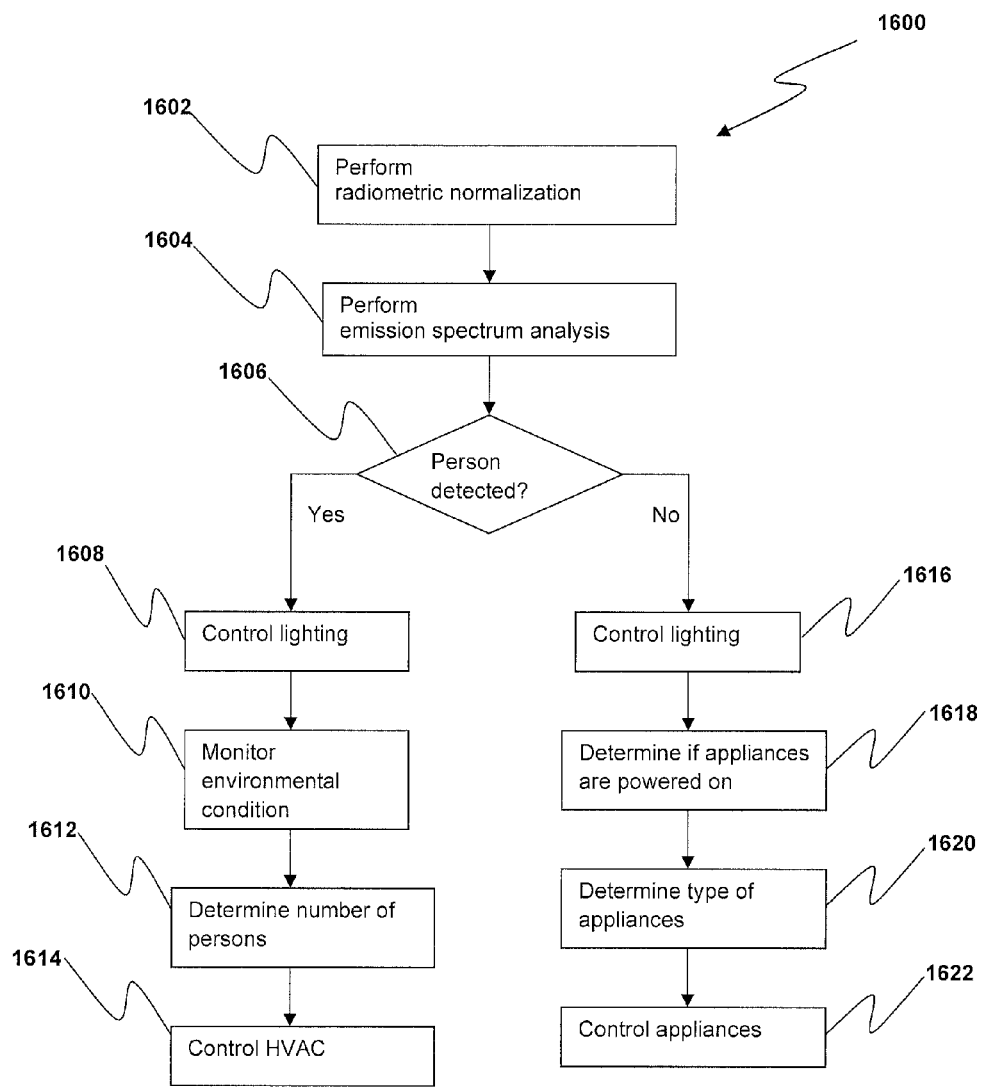
FIG. 16 illustrates a flowchart of a process for monitoring and controlling power usage in an area in accordance with an embodiment of the disclosure.

FIG. 16 illustrates a flowchart of a process 1600 for monitoring and controlling power usage in an area, in accordance with an embodiment of the disclosure. For example, process 1600 may be performed as part of process 1500 of FIG. 15, such as at block 1510 (process thermal images according to mode of operation) and block 1516 (generate command for action).

At block 1602, the captured thermal images, including data and information thereof, may be normalized, for example, to an absolute temperature scale by a radiometric normalization (e.g., performed by a submodule 1205 utilized by processor 1204 of system 1200). At block 1604, an emission spectrum analysis may be performed on the normalized radiometric images to detect for the presence of objects such as heat source, natural gas, other gas chemicals, etc., or to monitor environmental conditions such as temperature, humidity, etc.

In one embodiment, the emission spectrum analysis (e.g., thermal image data analysis) may be performed by analyzing the image data (e.g., radiometric image data) for intensity pattern in the near, middle, and far infrared spectrum. Objects of different composition and in different state (e.g., temperature) exhibit characteristic infrared spectral and intensity pattern. By correlating the spectral content and intensity profile of the radiometric image with the characteristic patterns emitted by different objects in different states, monitoring and controlling system (e.g., system 1200/1300A/1300B/1400) may identify the objects and the state of the objects. For example, the emission spectrum analysis may identify that there are one or more persons in the room by detecting the spectral intensity pattern corresponding to the body temperature profile of a human. In another example, the emission spectrum analysis may identify that there is a powered-on laptop computer or determine the temperature in the room by detecting the signature spectral intensity pattern corresponding to the heat generated by a laptop computer or the spectral intensity pattern corresponding to the infrared radiation emitted by ambient air at a known temperature. The emission spectrum analysis may be performed using techniques disclosed herein and/or with video analytic software, as would be understood by one skilled in the art.

Further, in one aspect, by collecting scene statistics for each pixel location, a background model of the scene (e.g., scene 1230) may be constructed. The exemplary background model may utilize an average of a time series of values for a given pixel. Because of the lack of shadows and general insensitivity to changing lighting conditions, background modeling may be more effective and less prone to false alarms with thermal images than visible light images. Once a background model has been constructed, regions of the images that differ from the background model may be identified. In the instance of a time series average as a background model, the background may be subtracted from the current captured video frame, and the difference may be compared to a threshold to find one or more "regions of interest" (ROI) corresponding to areas of greatest change. In one example, a detected ROI may indicate the presence of a person.

At block 1606, based on the results of the emission spectrum analysis, determination may be made (e.g., by processor 1204/1304/1404) whether there is a person within the FOV. If a person is detected, a command may be generated (e.g., by processor 1204/1304/1404) and transmitted (e.g., via communication module 1212/1312/1412) to appropriate devices and equipment to control the lighting in the room, at block 1608.

For example, the emission spectrum analysis may detect the presence of a person when the person walks into a room. Processor 1204/1304/1404 may also determine from the emission spectrum analysis that a fluorescent light in the room is off because there is no detection of spectral intensity pattern corresponding to a powered-on fluorescent light. If the fluorescent light is connected to a network, processor 1204/1304/1404 may generate a power-on command to turn on the fluorescent light through the network. Thus, the infrared imaging system may act as an automatic light switch that turns on the light in a room when it detects the presence of a person in the room.

At block 1610, environmental conditions, such as the temperature and/or humidity of an area, may be monitored and determined. For example, the emission spectrum analysis may analyze the thermal radiation level of ambient air outside of the proximity of objects that have been identified as heat source, such as a person or a fluorescent light, to determine the room temperature. In addition, the emission spectrum analysis may analyze the moisture level in the ambient air to determine the room humidity. In some embodiments, additional sensors such as temperature sensors and humidity sensors may be utilized for monitoring and determination of environmental conditions. At block 1612, the emission spectrum analysis determines the number of persons by identifying the number of spectral intensity patterns corresponding to the body temperature profile of a human. Based on the detected room temperature, humidity, and/or the number of people in the room, a command may be generated to control the HVAC system to control the temperature and/or the air flow in the room, at block 1614.

For example, if the HVAC system is connected to the network and the detected room temperature is higher than a desired temperature as determined by processor 1204/1304/1404, a powered-on command and the desired temperature setting may be communicated to the HVAC system via communication module 1212/1312/1412. Similarly, based on the number of persons in the room, processor 1204/1304/1404 may command the HVAC system to turn on the vent even if the temperature is at the desired temperature. Thus, the monitoring and controlling system (e.g., system 1200/1300A/1300B/1400) may act as an automatic thermostat that controls the HVAC system as a function of the number of persons in the room.

Turning now to the case in which no person was detected, if the emission spectrum analysis revealed that the light in the room is on, a command may be generated and transmitted to the lighting system to turn off the lights in the room, at block 1616. The emission spectrum analysis may similarly allow detection and control of power usage of computers and other appliances. For example, at block 1618, the emission spectrum analysis determines if a computer or an appliance is powered on by analyzing the thermal radiation level to detect the spectral intensity pattern corresponding to heat generated from a computer, an appliance, or other types of power-consuming devices. Once a powered-on device is detected, the emission spectrum analysis further determines the type of device by correlating the spectral intensity pattern against the characteristic pattern radiated by various types of devices, at block 1620. The length of time a device is powered on may also be determined. At block 1622, appropriate commands may be generated to control the power to a device based on the type of device and the length of time the device is powered on.

For example, blocks 1618 and 1620 may determine that a gas range is burning gas in one of the burners without the presence of a person in the room. Processor 1204/1304/1404 may set a time limit that the gas range is allowed to burn unattended. Then, at block 1622, if the time limit is reached, processor 1204/1304/1404 may, through the network, command the gas range to turn off gas to the burner so as to reduce the risk of fire hazard. In another example, blocks 1618 and 1620 may determine that a television set in the room is powered on without the presence of a person. Again, processor 1204/1304/1404 may set a time limit that the television set is allowed to be on with no one watching. In step 423, if the time limit is reached, processor 1204/1304/1404 may, through the network, command the television set to turn off so as to conserve power. Thus, the infrared imaging system may automatically control power to unattended appliances or devices for safety and conservation considerations.

In another embodiment, if there is no person in the area, the monitoring and controlling system may lower the temperature setting on the hot water heater in the house to conserve energy. In another embodiment, if there is no person in the house for an extended period of time, the monitoring and controlling system may command the hot water heater to go into the vacation mode. Conversely, the monitoring and controlling system may command the hot water heater to exist the vacation mode when it detects a person in the house or it may adjust the water temperature setting as a function of the number of persons detected in a house. It is also contemplated that process 1600 may be used to detect water in the environment through the emission spectrum analysis, such as determining that it is raining so that the infrared imaging system may shut off the sprinkler system for water conservation.

Figure 17:
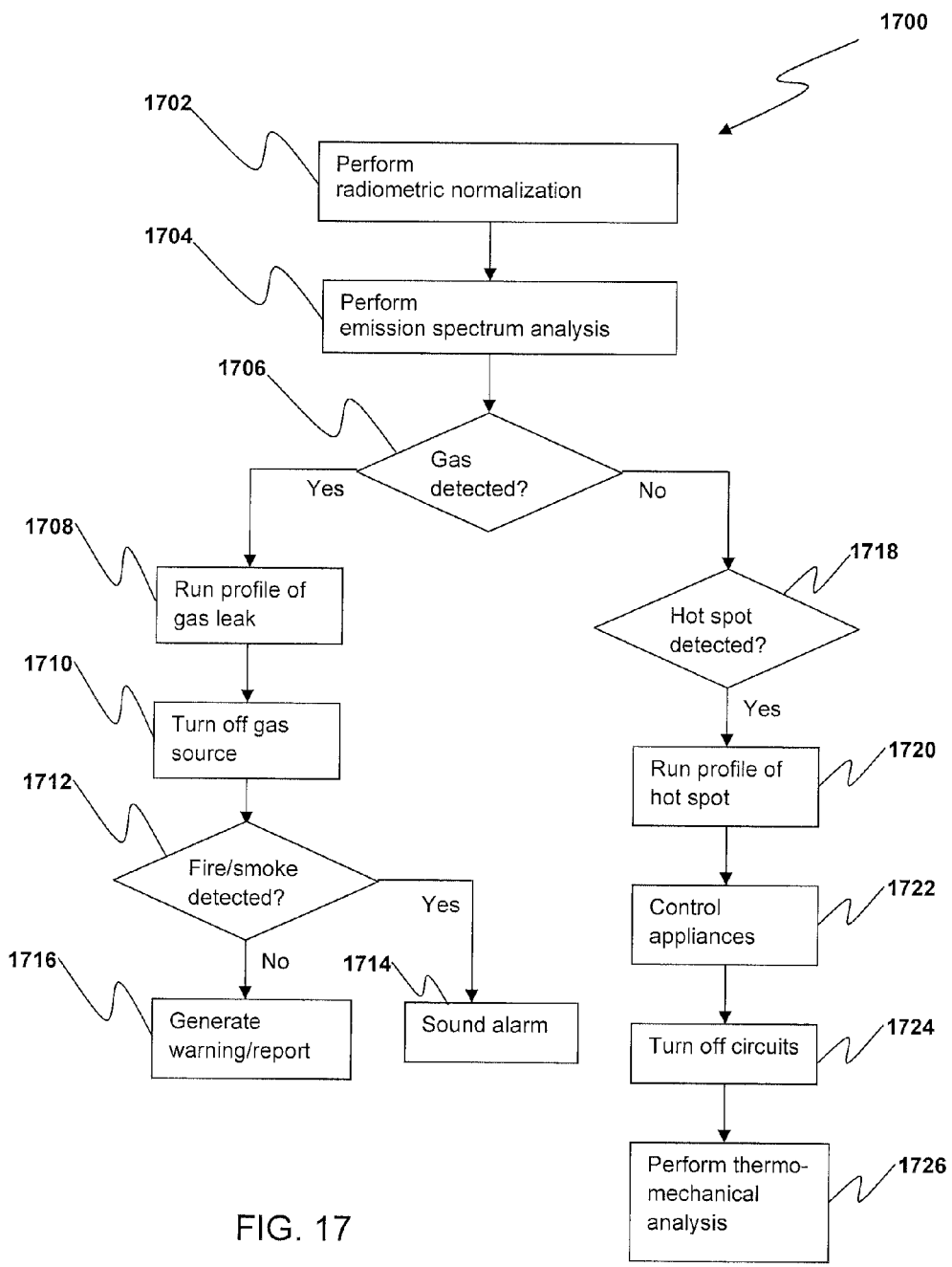
FIG. 17 illustrates a flowchart of a process for detecting hazardous conditions in an area in accordance with an embodiment of the disclosure.

FIG. 17 illustrates a flowchart of a process 1700 for detecting hazardous conditions in an area, in accordance with an embodiment of the disclosure. As with process 1600, process 1700 may be performed as part of process 1500 of FIG. 15, such as at block 1510 (process thermal images according to mode of operation) and block 1516 (generate command for action).

At block 1702, the captured thermal images are normalized by a radiometric normalization process. Block 1702 may be similar to block 1602 of FIG. 16. At block 1704, an emission spectrum analysis may be performed on the radiometric images to detect for the presence of hazardous chemicals or conditions such as a natural gas leak, carbon monoxide, volatile organic compound, fire, smoke, etc. As in block 1604, the emission spectrum analysis may be performed for different regions of the infrared spectrum. The spectral intensity pattern of the radiometric image may be correlated against the characteristic patterns emitted by different chemicals in different states to identify the presence of the chemicals and the state they are in.

At block 1706, based on the results of the emission spectrum analysis, determination may be made (e.g., by processor 1204/1304/1404) whether hazardous or combustible gas is present in the area. For example, the emission spectrum analysis may correlate the spectral intensity pattern of the captured image against the pattern corresponding to combustible hydrocarbon gas (e.g., methane/natural gas, propane, butane, pentane), volatile organic compound (e.g., benzene, toluene, various ethers, various ketones), carbon monoxide, or other types of gas detectible using infrared emission spectrum analysis. If there is sufficient correlation, processing component may determine that hazardous or combustible gas is present.

At block 1708, the emission spectrum analysis further analyzes the profile of the gas to determine the source of the gas and to further identify the safety hazard. For example, it may be determined from the spectral intensity pattern that there is a plume of natural gas in the room leaking from a gas pipe. Alternatively, it may be determined that the natural gas is merely residual gas that was not burned off completely from combustion in the burner of a gas range.

If it is determined that there is a hazardous gas leak, a command may be generated to turn off the gas at the source, at block 1710. For example, if a gas pipe is leaking natural gas and a gas valve controlling an inflow of gas is controllable from the network, processor 1204/1304/1404 may generate a command to the gas valve to shut off the flow of gas to prevent further build up of natural gas in the room. In another example, if carbon monoxide (CO) is detected as coming from a gas heater in an unventilated room, processor 1204/1304/1404 may generate a command to turn off the gas heater if it is controllable from the network. Alternatively or additionally, processor 1204/1304/1404 may generate a warning or sound an alarm to warn occupants in the room of the hazard.

At block 1712, the emission spectrum analysis may be further utilized to detect fire or smoke that may be the source of the gas. For example, the emission spectrum analysis analyzes the spectral intensity pattern for patterns corresponding to fire or smoke. If fire or smoke is detected, an alarm may be triggered at block 1714. An alarm may also be triggered if the source of the gas can not be controlled to shut off the gas, if the source of the gas can not be identified, or in other situations where it is prudent to evacuate the room. If fire or smoke is not detected and evacuation is not necessary, a warning or a report of the result may be generated, such as to display 1208/1308/1408. Thus, the monitoring and controlling system (e.g., system 1200/1300A/1300B/1400) may act as a carbon monoxide detector, a natural gas detector, a fire/smoke alarm, or as a detector for other types of hazardous or combustible gas.

Turning now to the case in which no hazardous or combustible gas was detected, the emission spectrum may be further utilized to detect electrical hot spots or other types of safety hazards. For example, at block 1718, the emission spectrum analysis searches for electrical hot spots by analyzing the thermal radiation level for pattern that corresponds to heat generated from electrical hot spots.

If an electrical hot spot is detected, the emission spectrum analysis further analyzes, at block 1720, the profile of the hot spot to determine whether it is an electrical short or other types of electrical hazards. It will be appreciated that the emission spectrum analysis may detect electrical hot spots and hazards from various sources including, but not limited to, various types of electrical devices, appliances, and equipment (e.g., fuse, circuit breaker, electrical outlet, power generator, power distribution board, etc.). For example, a profile of the hot spot may indicate that the electrical hot spot is from a coffee maker. From the profile of the heat or the spectral intensity pattern of water vapor evaporating from the coffee maker, the emission spectrum analysis may further determine whether there is water in the coffee pot. Alternatively, a profile of the hot spot may indicate that it is caused by an electrical short in an appliance.

At block 1722, from the results of emission spectrum analysis, appropriate commands may be generated to control power to the appliances if there is a safety hazard. For example, if a coffee maker is turned on without water in the coffee pot, processor 1204/1304/1404 may, through the network, command the coffee maker to turn off. Thus, the monitoring and controlling system (e.g., system 1200/1300A/1300B/1400) may act as a detector of electrical hazards and further controls power to electrical devices to remedy the electrical hazards. If the electrical hot spot can not be remedied by powering off the appliance, such as an electrical short in a wall circuit or in an extension cord, processor 1204/1304/1404 may turn off power to the circuit at block 1724. In this manner, the monitoring and controlling system may act as a circuit breaker.

In addition to being used as a detector of safety hazards, the monitoring and controlling system may further perform, at block 1726, thermo-mechanical analysis of appliances to prevent the safety hazards from developing in the first place. For example, for a water heater that undergoes repeated heating/cooling cycles, the emission spectrum analysis may track the number of heating cycles and the history of the water temperature to warn when the water heater needs to be replaced due to thermal metal fatigue. In addition to detecting electrical hot spots and other safety hazards, it is contemplated that process 1700 may be used to detect wet spot, water leak, ruptured plumbing, or water damage that may result from plumbing problems or leaky roofs. Thus, the monitoring and controlling system may act as a detector of water problem in the house.

Figure 18:
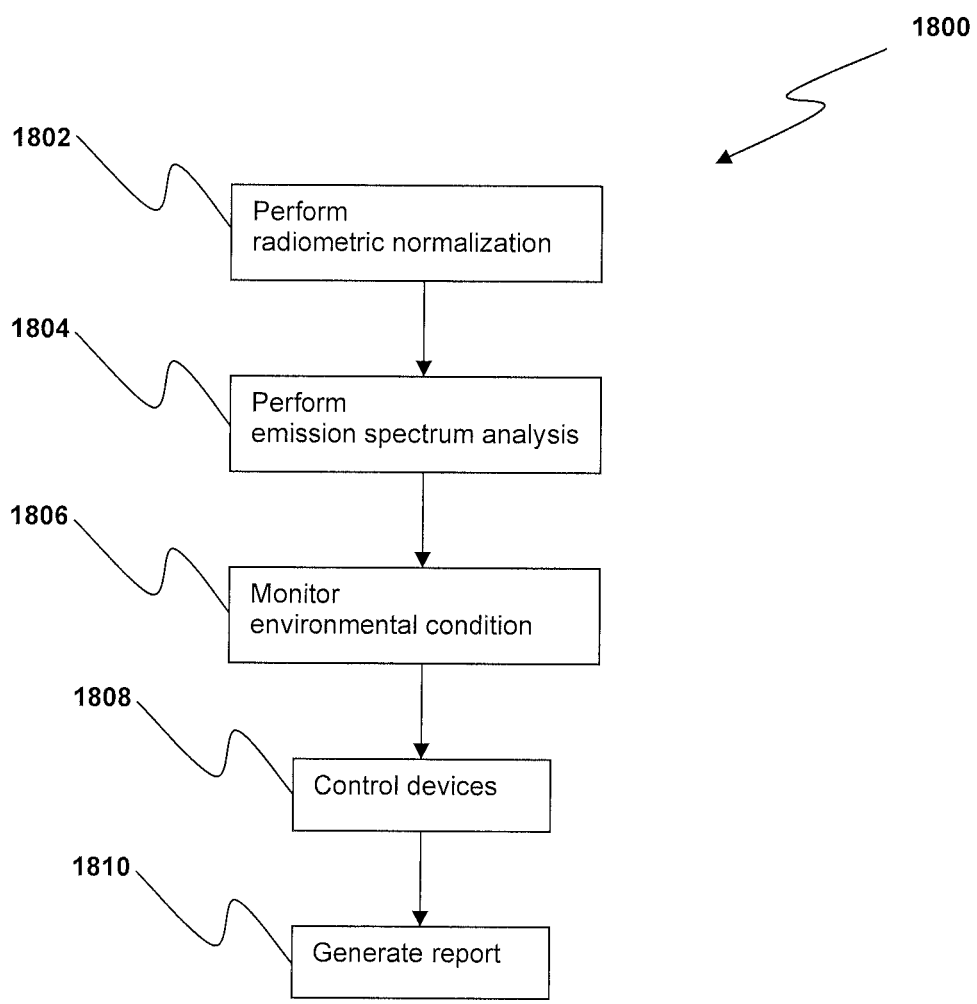
FIG. 18 illustrates a flowchart of a process for monitoring and analyzing energy usage and environmental condition for maximizing energy efficiency in a structure in accordance with an embodiment of the disclosure.

FIG. 18 illustrates a flowchart of a process 1800 for monitoring and analyzing energy usage and environmental condition for maximizing energy efficiency in a structure, in accordance with an embodiment of the disclosure. As with processes 1600 and 1700, process 1800 may be performed as part of process 1500 of FIG. 15, such as at block 1510 (process thermal images according to mode of operation) and block 1516 (generate command for action).

At block 1802, the captured thermal images are normalized by a radiometric normalization process. Block 1802 may be similar to block 1602 of FIG. 16. At block 1804, an emission spectrum analysis may be performed on the radiometric images to analyze how energy is used. For example, the emission spectrum analysis may analyze the thermal radiation level to detect heat generated from power-consuming devices. The type of device may be determined by correlating the spectral intensity pattern against the characteristic pattern radiated by various types of devices. Processor 1204/1304/1404 may track the time the devices are in operation. From the knowledge of the types of device and their time of operation, processor 1204/1304/1404 may generate an audit report of energy usage in the room. Reports from multiple rooms may be combined to generate an energy audit report for the house or building. As a result, the energy audit report may show the energy usage for computers, household appliances, lighting, and HVAC system in the house over time.

At block 1806, environmental conditions such as temperature, humidity, etc. may be monitored at various points in a structure. In one embodiment, the emission spectrum analysis may analyze the thermal radiation level to monitor the distribution of thermal energy in a room. For example, if there is insufficient thermal insulation around windows or doors, the air temperature around the poorly insulated windows or doors may be cooler relative to the rest of the room when air temperature inside the room is warmer than outside air temperature. Conversely, the air temperature around the windows or doors may be warmer relative to the rest of the room when inside temperature is cooler than outside temperature. Thus, the monitoring and controlling system (e.g., system 1200/1300A/1300B/1400) may monitor environmental conditions to determine the energy efficiency of the room.

From knowledge of energy use and energy efficiency, appropriate commands may be generated, at block 1808, to control power usage in the room or in the structure to maximize energy efficiency. For example, processor 1204/1304/1404 may control the HVAC system to reduce energy usage when the occupants of the house are asleep such as by redistributing heating/cooling to bedrooms or by adjusting the temperature setting in the house. In one embodiment, appropriate commands may be generated to control the shade, blind, or fan in the room to reduce heat loss or to dissipate excess heat from the room. In another embodiment, the monitoring and controlling system may be integrated with the smart grid system to schedule power usage in the structure so as to minimize energy cost and to reduce energy use during time of peak demand. For example, processor 1204/1304/1404 may schedule appliances such as the dishwasher, washing machine, and/or dryer to run at night to take advantage of the lower billing rate for energy usage during time of less demand.

At block 1810, a report of energy use for the house or building over time may be generated from results of the emission spectrum analysis. The report may identify areas of energy inefficiency and may recommend ways to remedy the problem. For example, for a poorly insulated house or building, the report may suggest areas needing enhanced insulation. Thus, the monitoring and controlling system (e.g., system 1200/1300A/1300B/1400) may act as an energy monitoring system that automatically controls power usage and generates audit report to maximize energy efficiency and minimize energy cost for a house or a building.

Figure 19:
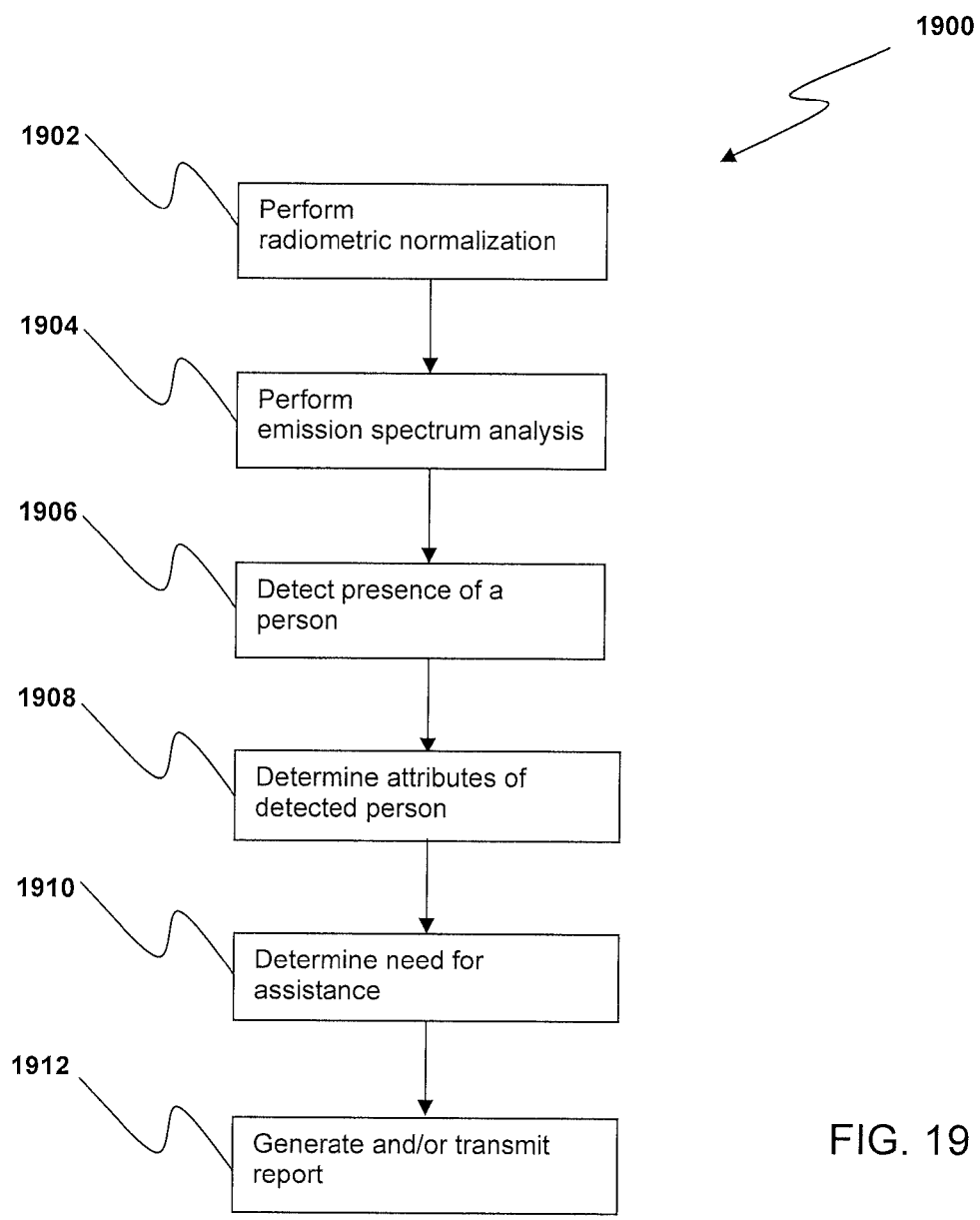
FIG. 19 illustrates a flowchart of a process for monitoring and analyzing thermal image data and reporting persons that may need assistance in accordance with an embodiment of the disclosure.

FIG. 19 illustrates a flowchart of a process 1900 for monitoring and reporting persons in need of assistance, in accordance with an embodiment of the disclosure. For example, process 1900 may be performed as part of process 1500 of FIG. 15, such as at block 1510 (process thermal images according to mode of operation) and block 1516 (generate command for action), when an emergency is detected.

At block 1902, the captured thermal images are normalized by a radiometric normalization process. Block 1902 may be similar to block 1602 of FIG. 16. At block 1904, an emission spectrum analysis may be performed. Based on the emission spectrum analysis, a determination may be made (e.g., by processor 1204/1304/1404) whether there is a person within the field of view, at block 1906. Blocks 1904 and 1906 may be similar to blocks 1604 and 1606 of FIG. 16, respectively.

If one or more persons are detected, various attributes of the detected persons may be determined based on further analysis of the radiometric thermal images, at block 1908. In one embodiment, a posture of the detected person may be determined by analyzing the profile and aspect ratio of the detected person in the thermal images. For example, whether a person is standing up or has fallen down may be determined by techniques described in commonly assigned PCT Patent Application PCT/US2-12/025692 filed Feb. 17, 2012, which claims priority to U.S. Provisional Patent Application No. 61/445,254 filed Feb. 22, 2011, which are incorporated herein by reference in their entirety. Other attributes, such as the approximate body temperature of the detected person and the duration for which the person remained motionless, may also be determined. Alternatively or in addition, various thermal image software analysis tools (e.g., video analytics) may be applied for thermal image analysis in accordance with the techniques disclosed herein and as would be understood by one skilled in the art.

At block 1910, based on the attributes, a determination may be made as to whether the detected person may be in need of assistance. For example, it may be determined whether a person has been lying down motionless for more than a certain length of time and/or has a body temperature below a normal range. If so, the detected person may be marked as likely to need assistance.

At block 1912, information regarding the detected person may be transmitted to and/or accessed at a central reporting system (e.g., via communication module 1212 or base unit 1452). Such information may include the location of the detected person, the attributes of the detected persons, and whether the person likely needs assistance. Thus, for example, process 1900 may provide to emergency responders beneficial information that may be utilized to locate rescuees and plan a rescue operation (e.g., prioritize rescuees based on the indication of whether they may need assistance).

Figure 20:
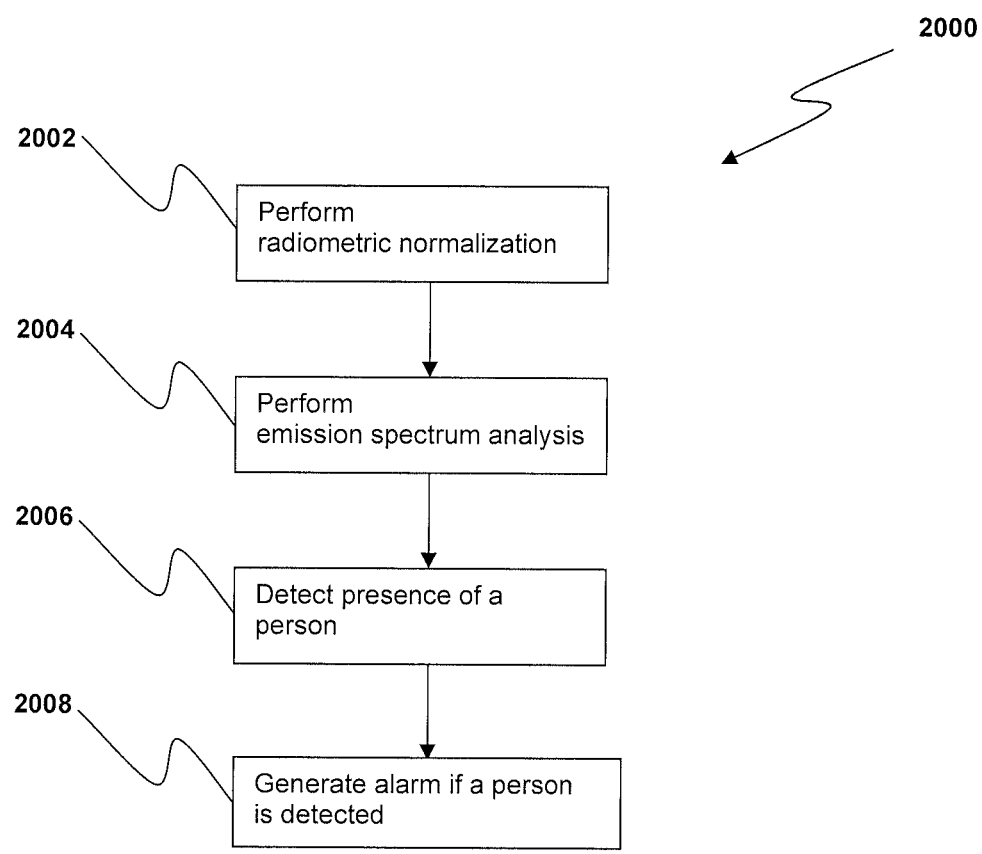
FIG. 20 illustrates a flowchart of a process for monitoring and analyzing thermal image data and reporting for security applications in accordance with an embodiment of the disclosure.

FIG. 20 illustrates a flowchart of a process 2000 for detecting intruders, in accordance with an embodiment of the disclosure. For example, process 2000 may be performed as part of process 1500 of FIG. 15, such as at block 1510 (process thermal images according to mode of operation) and block 1516 (generate command for action).

At block 2002, the captured thermal images are normalized by a radiometric normalization process. Block 2002 may be similar to block 1602 of FIG. 16. At block 2004, an emission spectrum analysis may be performed. Based on the emission spectrum analysis, a determination may be made (e.g., by processor 1204/1304/1404) whether there is a person within the field of view, at block 2006. Blocks 2004 and 2006 may be similar to blocks 1604 and 1606 of FIG. 16, respectively.

If a person is detected in the thermal images based on the emission spectrum analysis, an alarm may be generated (e.g., activating alarms 1458, an email alert, a text message, and/or any other desired form of communication for a desired warning) at block 2008 to notify appropriate people (e.g., home owner, the police, or other appropriate personnel). Because the various radiometric thermal image analyses as described above may be utilized to detect of a presence of a person (e.g., an intruder, a burglar, or other unwanted persons), process 2000 may be much less prone to false detection. For example, whereas conventional security sensor systems may be falsely triggered by pets and animals left in premises, thermal image analyses may permit differentiating between persons and animals and thus provide more robust and accurate security monitoring.

In general in accordance with one or more embodiments, thermal sensors may be strategically positioned in a building for use to monitor and control various building parameters (e.g., HVAC system, environmental conditions, building equipment, hazard detection, safety and rescue, and/or emergency sensors, etc., as disclosed herein) and provide an alert/document and/or allow first responders to access a central reporting system (e.g., processor or control system) to view information and respond accordingly. As an example for some embodiments, the number, physical (e.g., health) status, and location of people remaining in the building may be determined based on the thermal sensor information, which may allow responders (e.g., building management and/or emergency personnel) to prioritize their actions (e.g., persons lying on the ground or trapped in a dangerous location may be given higher priority).

As a further example for some embodiments, the thermal sensor information may also be used as security sensors for alarm systems (e.g., intruder alert). The thermal sensor information may also be analyzed to differentiate between humans and animals, which may reduce false alarm rates (e.g., in homes with pets). The thermal sensor information may be analyzed, as discussed herein and/or based on video analytic software, to compile the indicated information and analyze the thermal image data, as would be understood by one skilled in the art.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
one or more infrared imaging modules comprising a focal plane array (FPA) configured to:
capture thermal images of an area, and
capture a thermal image frame that comprises thermal image data and noise introduced by the infrared imaging module;
a processor configured to:
determine, for each row of the thermal image frame, a corresponding row fixed-pattern noise (FPN) correction term, and for each column of the thermal image frame, a corresponding column FPN correction term;
apply the row and the column FPN correction terms to the thermal image frame to provide a corrected thermal image frame;
process the corrected image frame to determine a plurality of non-uniform correction (NUC) terms to reduce a portion of the noise comprising spatially uncorrelated FPN,
apply the NUC terms to the thermal images,
perform an analysis of the thermal images,
determine a presence of one or more persons present in the area based on the analysis of the thermal images,
identify one or more objects in the area,
determine respective power usage states associated with the one or more objects in the area based on the analysis of the thermal images, and
generate control signals to control future power usage associated with the one or more objects in response to the presence of one or more persons present in the area and the determined power usage states respectively associated with the one or more objects; and
a network interface component (NIC) configured to transmit the control signals to control the future power usage of the one or more objects.

2. The system of claim 1, wherein:
the one or more objects include at least one of a heater, an air conditioner, a heating ventilation air conditioning (HVAC) unit, a water heater, an oven, a lamp, or a lighting fixture; and
the one or more infrared imaging modules are radiometrically calibrated to generate the thermal images that is radiometrically normalized to a temperature scale.

3. The system of claim 1, wherein the processor is further configured to:
identify a hazardous condition in the area and to determine a source of the hazardous condition based on the analysis of the thermal images;
generate a control signal to remedy the hazardous condition if the source is controllable; and
generate a warning if the hazardous condition is not capable of being remedied.

4. The system of claim 3, wherein the identified hazardous condition includes at least one of a carbon monoxide (CO) gas leak, a combustible gas leak, fire, smoke, an electrical hot spot, a water leak, or flood.

5. The system of claim 1, wherein the processor is further configured to:
determine one or more environmental conditions including a humidity level of the area; and
generate the control signals in further response to the one or more determined environmental conditions of the area.

6. The system of claim 1, wherein the processor is further configured to identify respective object types of the one or more objects based on the analysis of the thermal images, and to generate the control signals in further response to the respective object types of the one or more objects.

7. The system of claim 1, wherein the processor is further configured determine energy usage associated with the one or more objects.

8. The system of claim 7, wherein the processor is further configured to:
perform an analysis of the energy usage associated with the one or more objects; and
make suggestions to increase energy efficiency of the one or more objects.

9. The system of claim 1, wherein:
the thermal images are unblurred thermal images of the area; and
the thermal image frame comprises an intentionally blurred thermal image frame that comprises thermal image data associated with the area and the noise introduced by the infrared imaging module.

10. A method comprising:
capturing, at a focal plane array of an infrared imaging module, thermal images of an area;
capturing a thermal image frame that comprises thermal image data and noise introduced by the infrared imaging module;
determining, for each row of the thermal image frame, a corresponding row fixed-pattern noise (FPN) correction term, and for each column of the thermal image frame, a corresponding column FPN correction term;
applying the row and the column FPN correction terms to the thermal image frame to provide a corrected thermal image frame;
processing the corrected image frame to determine a plurality of non-uniform correction (NUC) terms to reduce a portion of the noise comprising spatially uncorrelated FPN,
applying the NUC terms to the thermal images;
performing an analysis of the thermal images;
determining a presence of one or more persons present in the area based on the analysis of the thermal images;
identifying one or more objects in the area;
determining respective power usage states associated with the one or more objects in the area based on the analysis of the thermal images;
generating control signals to control future power usage associated with the one or more objects in response to the presence of one or more persons present in the area and the determined power usage states respectively with the one or more objects; and
communicating the control signals to the one or more objects over a network.

11. The method of claim 10, further comprising radiometrically normalizing the thermal images to a temperature scale, wherein the one or more objects include at least one of a heater, an air conditioner, a heating ventilation air conditioning (HVAC) unit, a water heater, an oven, a lamp, or a lighting fixture.

12. The method of claim 10, wherein:
identifying a hazardous condition in the area and determining a source of the hazardous condition based on the analysis of the thermal images; and
said generating of the control signals comprises:
generating a control signal to the source to remedy the hazardous condition if the source is controllable; and
generating a warning if the hazardous condition is not capable of being remedied.

13. The method of claim 12, wherein the identified hazardous condition includes at least one of a carbon monoxide (CO) gas leak, a combustible gas leak, fire, smoke, an electrical hot spot, a water leak, or flood.

14. The method of claim 10, wherein:
determining one or more environmental conditions including a humidity level of the area; and
said generating of the control signals is in further response to the one or more determined environmental conditions of the area.

15. The method of claim 10, wherein:
the method further comprises identifying respective object types of the one or more objects based on the analysis of the thermal images; and
said generating of the control signals is in further response to the respective object types of the one or more object types.

16. The method of claim 10, further comprising determining energy usage associated with the one or more objects.

17. The method of claim 16, further comprising:
performing an analysis of the energy usage associated with the one or more objects; and
making suggestions to increase energy efficiency of the one or more objects.

18. The method of claim 10, wherein:
the thermal images are unblurred thermal images; and
the thermal image frame comprises an intentionally blurred thermal image frame that comprises thermal image data associated with the external environment and the noise introduced by the infrared imaging module.

19. The system of claim 1, wherein the processor is further configured to:
determine a number and physical statuses of persons present in the area based on the analysis of the thermal images, the physical statuses including postures and/or durations of motionlessness of persons present in the area determined based on the analysis of the thermal images;
determine that the persons present in the area are asleep or resting based on the postures and/or the duration of motionlessness of the persons; and
generate control signals to reduce the future power usage associated with the one or more objects in response to determining that the persons present in the area are asleep or resting.

20. The method of claim 10, further comprising:
determining a number and physical statuses of persons present in the area based on the analysis of the thermal images, the physical statuses including postures and/or durations of motionlessness of persons present in the area determined based on the analysis of the thermal images;
determining that the persons present in the area are asleep or resting based on the postures and/or the duration of motionlessness of the persons; and
generating control signals to reduce the future power usage associated with the one or more objects in response to determining that the persons present in the area are asleep or resting.

* * * * *